US012730879B1

(12) United States Patent
LaPine

(10) Patent No.: US 12,730,879 B1
(45) Date of Patent: Sep. 8, 2026

(54) SYSTEMS AND METHODS FOR ENFORCING A NO-HARM DIRECTIVE IN ARTIFICIAL INTELLIGENCE USING CONSTRAINED OPTIMIZATION AND RUNTIME SAFETY SHIELDING

(71) Applicant: Anthony LaPine, Los Gatos, CA (US)

(72) Inventor: Anthony LaPine, Los Gatos, CA (US)

( * ) Notice: Subject to any disclaimer, the term of this patent is extended or adjusted under 35 U.S.C. 154(b) by 0 days.

(21) Appl. No.: 19/450,659

(22) Filed: Jan. 15, 2026

(51) Int. Cl.
*G06F 21/52* (2013.01)
*G06N 20/00* (2019.01)

(52) U.S. Cl.
CPC ............. *G06F 21/52* (2013.01); *G06N 20/00* (2019.01)

(58) Field of Classification Search
CPC ................................ G06F 21/52; G06N 20/00
USPC ............................................................ 726/22
See application file for complete search history.

(56) References Cited

U.S. PATENT DOCUMENTS

2017/0323385 A1 * 11/2017 Sivaramakrishnan ....................... G06Q 40/06
2019/0266688 A1 * 8/2019 Denton .................. G06N 20/00
2025/0292091 A1 * 9/2025 Smith .................... G06N 3/063

* cited by examiner

*Primary Examiner* — Bryan F Wright
(74) *Attorney, Agent, or Firm* — GALVIN PATENT LAW LLC; Brian R. Galvin

(57) ABSTRACT

A system and method for enforcing a no-harm directive in artificial intelligence systems using a unified training-and-runtime control framework. A harm functional assigns quantitative harm scores to candidate actions in a given state or context, and a policy model is trained via constrained optimization to maximize a primary utility subject to harm constraints, including probability-of-harm limits, tail-risk limits, and optionally cumulative harm budgets. A runtime safety enforcement module mediates deployment by evaluating proposed actions using a harm predictor and constraint policy, and by performing interception, substitution with safe alternatives, or abstention when constraints are predicted to be violated or confidence is insufficient. A monitoring and audit pipeline records decisions and outcomes and may generate triggers for recalibration, rollback, or retraining. In some embodiments, harm predictor calibration is updated using federated aggregation of local calibration signals across distributed instances to improve reliability while preserving data privacy.

13 Claims, 11 Drawing Sheets

SYSTEMS AND METHODS FOR ENFORCING A NO-HARM DIRECTIVE IN ARTIFICIAL INTELLIGENCE USING CONSTRAINED OPTIMIZATION AND RUNTIME SAFETY SHIELDING

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of artificial intelligence (AI) safety and control, and more particularly to enforcing a no-harm directive in artificial intelligence systems using harm-based risk constraints during training and runtime safety shielding configured to intercept, substitute, or abstain from unsafe actions.

Discussion of the State of the Art

Existing AI safety techniques have developed along several largely separate lines. One line of work focuses on "safe" or constrained reinforcement learning, in which a policy is trained with explicit constraints or penalties intended to reduce unsafe behavior, often using Lagrange-multiplier or related approaches and risk measures such as Conditional Value-at-Risk (CVaR) to control tail-risk outcomes. Another line of work uses chance constraints that bound the probability of constraint violations to promote near-certain safety at each decision step.

Despite this progress, these approaches tend to address only individual facets of the overall "no-harm" problem. Many constrained-training approaches focus on a single risk metric or a single constraint family, and are frequently tailored to narrow domains (e.g., collision avoidance or content filtering). In addition, typical implementations assume a known, fixed harm or cost function and do not incorporate a learned harm estimation model with confidence handling, making them brittle when harms are context-dependent or partially observed.

Separately, runtime safety mechanisms (including external "shields," rule-based filters, or minimal correction strategies) can reduce unsafe actions after a model proposes them, but often do not integrate with training objectives and therefore cannot provide consistent, end-to-end guarantees across both development and deployment. Industry practice commonly relies on heuristic moderation or rule-based gating that can be incomplete, difficult to audit, and lacking in probabilistic guarantees, particularly when model behavior shifts due to distribution drift or new environments.

What is needed is a unified, technically implementable AI control framework that formally defines and quantifies harm, enforces multi-tier probabilistic harm constraints during training, deploys a runtime safety mechanism capable of intercepting, substituting, or abstaining from unsafe actions, and provides a mechanism for ongoing monitoring and calibration so the system maintains no-harm compliance across diverse domains and operating conditions.

SUMMARY OF THE INVENTION

Accordingly, the inventor has conceived and reduced to practice, a system and method for enforcing a no-harm directive in artificial intelligence systems using a unified training-and-runtime control framework. A harm functional assigns quantitative harm scores to candidate actions in a given state or context, and a policy model is trained via constrained optimization to maximize a primary utility subject to harm constraints, including probability-of-harm limits, tail-risk limits, and optionally cumulative harm budgets. A runtime safety enforcement module mediates deployment by evaluating proposed actions using a harm predictor and constraint policy, and by performing interception, substitution with safe alternatives, or abstention when constraints are predicted to be violated or confidence is insufficient. A monitoring and audit pipeline records decisions and outcomes and may generate triggers for recalibration, rollback, or retraining. In some embodiments, harm predictor calibration is updated using federated aggregation of local calibration signals across distributed instances to improve reliability while preserving data privacy.

According to a preferred embodiment, a system for enforcing a no-harm directive in an artificial intelligence system is disclosed, the system comprising: one or more processors and one or more non-transitory computer-readable media storing instructions that, when executed, cause the system to: train a policy model under a plurality of harm constraints by solving a constrained optimization that maximizes a primary utility subject to the plurality of harm constraints, the plurality comprising at least two different constraint types selected from: a probability-of-harm limit, a tail-risk limit, and a cumulative harm budget; evaluate a candidate action at runtime using a harm predictor that outputs a harm estimate and a confidence measure, and enforce a no-harm constraint policy by permitting execution, substituting a safe alternative, or abstaining when constraints or confidence thresholds are not satisfied; monitor and log the enforcement decision, harm estimate, context, and observed outcomes in an audit log, compute safety metrics, and generate recalibration or rollback triggers upon detection of drift, anomalies, or constraint violations; and update the harm predictor using federated calibration comprising local calibration statistics computed at deployed instances, privacy-preserving aggregation, and distribution of updated calibration artifacts.

According to another preferred embodiment, a computer-implemented method for enforcing a no-harm directive in an AI system is disclosed, comprising the steps of: defining a harm functional and a constraint profile comprising at least a probability-of-harm limit and a tail-risk limit; training a policy via primal-dual or Lagrangian updates until constraint residuals meet a predefined tolerance; at runtime, receiving state/context and a candidate action, obtaining a calibrated harm score and confidence, and applying a multi-tier enforcement that allows, substitutes, or abstains; logging enforcement records with model/version provenance and correlating records with observed outcomes; and performing federated calibration to update harm predictor calibration mappings and confidence parameters.

According to a further aspect, the tail-risk limit comprises Conditional Value-at-Risk at a confidence predetermined level.

According to a further aspect, the cumulative harm budget is enforced across an episode or rolling time window with reset conditions.

According to a further aspect, the harm predictor is calibrated via temperature scaling, isotonic regression, or histogram binning and outputs epistemic and aleatoric uncertainty.

According to a further aspect, the no-harm constraint policy includes a minimum confidence threshold that triggers conservative decisioning or abstention.

According to a further aspect, the system comprises a human-value utility function module providing preference signals or normative constraints incorporated into training and/or enforcement.

According to a further aspect, safe substitution comprises at least one of: parameter clipping to a safe envelope, tool-path rerouting, content redaction, or fallback templates stored in a safe-action repository.

According to a further aspect, wherein monitoring computes near-miss rates, constraint activation rates, expected calibration error (ECE), and drift scores, and generates alerts via an operator console.

According to a further aspect, federated calibration applies differential privacy noise injection, secure multiparty aggregation, trimmed-mean or median-based robust aggregation.

According to a further aspect, the method includes controlled rollout with canary deploys, release gatekeeping, compatibility checks among policy, harm predictor, and calibration artifacts, and rollback upon safety regression.

According to a further aspect, the method includes abstention comprising a safe-stop command for physical systems or a request-for-clarification for conversational systems.

BRIEF DESCRIPTION OF THE DRAWING FIGURES

DETAILED DESCRIPTION OF THE INVENTION

Figure 1:
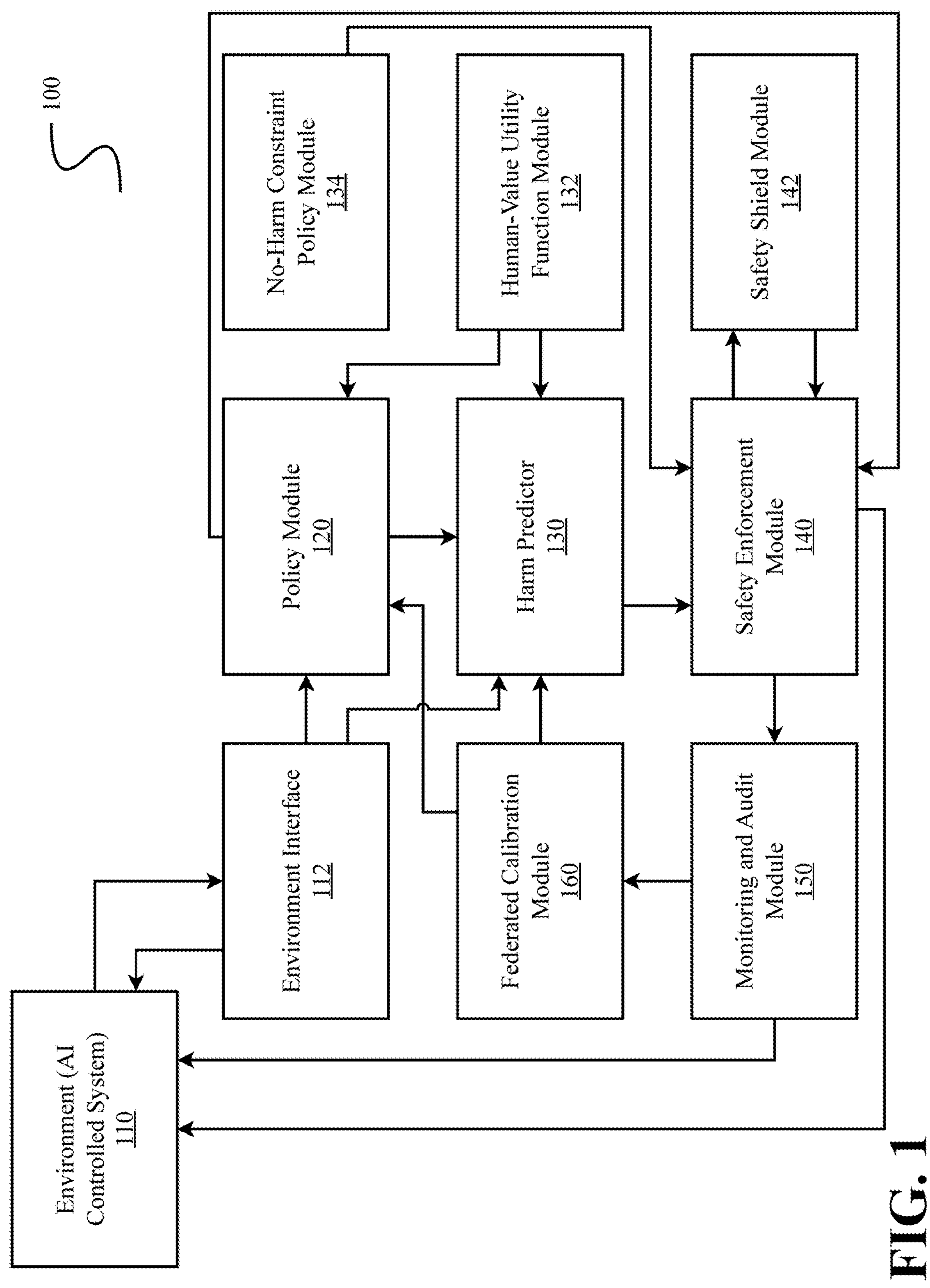
FIG. 1 is a block diagram illustrating an exemplary system architecture for enforcing a no-harm directive in an artificial intelligence system, according to an embodiment.

The inventor has conceived, and reduced to practice, a system and method for enforcing a no-harm directive in artificial intelligence systems using a unified training-and-runtime control framework. A harm functional assigns quantitative harm scores to candidate actions in a given state or context, and a policy model is trained via constrained optimization to maximize a primary utility subject to harm constraints, including probability-of-harm limits, tail-risk limits, and optionally cumulative harm budgets. A runtime safety enforcement module mediates deployment by evaluating proposed actions using a harm predictor and constraint policy, and by performing interception, substitution with safe alternatives, or abstention when constraints are predicted to be violated or confidence is insufficient. A monitoring and audit pipeline records decisions and outcomes and may generate triggers for recalibration, rollback, or retraining. In some embodiments, harm predictor calibration is updated using federated aggregation of local calibration signals across distributed instances to improve reliability while preserving data privacy.

In some embodiments, a computer-implemented method is provided for creating and operating an artificial intelligence (AI) system under a no-harm directive. The method may include defining a harm functional configured to assign a quantitative harm score to an action in a given state. The method may further include training a neural network policy model by solving a constrained optimization problem that maximizes a primary utility function subject to one or more harm constraints. In various embodiments, the harm constraints may include at least a limit on a probability of harm and a limit on a tail-risk severity measure, and the training process may include iterative updates performed using a primal-dual method, a Lagrangian method, or another constrained optimization technique until convergence within a predefined error tolerance. In some embodiments, the method includes deploying a runtime safety enforcement module configured to intercept, modify, or block a proposed action predicted to violate the harm constraints, thereby maintaining compliance with the no-harm directive during operation.

In some embodiments, the runtime safety enforcement module includes a Safety Shield configured to perform interception, abstention, and substitution of unsafe actions. In certain embodiments, the Safety Shield is configured to implement interception by preventing execution of a candidate action when a harm predictor indicates that the candidate action violates a harm constraint; to implement abstention by outputting a no-action decision, refusal, safe-stop command, or request-for-clarification response when no sufficiently safe alternative exists; and to implement substitution by selecting and outputting a substitute action from a safe-action set when a substitute action is available that satisfies the harm constraints. In some embodiments, the runtime safety enforcement module further includes a calibration mechanism configured to ensure that confidence levels associated with harm predictor outputs satisfy one or more predefined thresholds, and to apply conservative decisioning when confidence falls below a threshold.

In some embodiments, the harm constraints include (a) a per-action harm probability limit, (b) a tail-risk severity limit, and (c) a cumulative harm limit over a time horizon, interaction window, or episode. In certain embodiments, the tail-risk severity limit is expressed as a Conditional Value-at-Risk (CVaR) limit at a selected confidence level, such as at least ninety-five percent (95%), although other confidence levels may be used. In some embodiments, the training objective incorporates the harm functional into a loss function alongside the primary utility, thereby forming a composite objective that is optimized subject to the harm constraints. In some embodiments, iterative updates continue until constraint satisfaction is achieved within a tolerance, thereby producing a trained policy that satisfies the harm constraints to a predefined degree.

In some embodiments, the method further includes training a harm predictor model jointly with, or in parallel with, training of the policy model, wherein the harm predictor model is configured to estimate harm during training and runtime. In some embodiments, the method further includes computing an auxiliary human-value utility function configured to align actions with one or more ethical principles, normative constraints, or deployment-specific preferences, and incorporating outputs of the auxiliary human-value utility function into training and/or runtime decisioning.

In some embodiments, a system is provided that includes a policy module, a harm evaluation module, a safety enforcement module, and a monitoring module, wherein the system is configured to enforce a no-harm directive during training and runtime. In certain embodiments, the safety enforcement module is configured to substitute a safe alternative action from a predefined safe-action set when harm is predicted. In some embodiments, the monitoring module is configured to record candidate actions, harm estimates, constraint evaluations, enforcement outcomes, and observed outcomes, thereby enabling auditing, safety reporting, and update triggering.

In some embodiments, harm predictor calibration is updated via federated learning across distributed AI instances. In such embodiments, calibration updates may be derived locally at each instance based on observed outcomes and prediction residuals, aggregated across instances in a privacy-preserving manner, and redistributed to the instances to improve harm prediction confidence and calibration without requiring centralized collection of raw sensitive data.

In some embodiments, a non-transitory computer-readable medium stores instructions that, when executed by one or more processors, cause performance of any of the methods described herein. In some embodiments, the AI system comprises an autonomous vehicle, and the harm functional is defined as a collision-risk metric, and the runtime safety enforcement module is configured to enforce abstention when no safe maneuver exists.

In some embodiments, the systems and methods described herein provide a unified training-runtime-calibration loop that integrates safety enforcement across the complete lifecycle of an AI system. Unlike prior safe reinforcement learning approaches that constrain training objectives in isolation, or runtime shields that act post-hoc on already-trained models, the system combines multi-tier constrained optimization during training (including probability limits, CVaR tail-risk bounds, and cumulative harm budgets) with a runtime Safety Shield that performs allow/substitute/abstain decisions, and further includes privacy-preserving federated calibration that continuously aligns predicted harm with observed outcomes across multiple deployments. This integrated approach ensures consistent no-harm enforcement from initial training through operational deployment and ongoing model maintenance, providing end-to-end safety guarantees not achievable through isolated training constraints or runtime filtering alone.

According to some embodiments, the system and methods described herein provides confidence-aware enforcement mechanisms that incorporate calibrated confidence measures into runtime decision-making. Rather than relying on heuristic gating or fixed thresholds, the runtime safety enforcement module evaluates both the predicted harm score and a calibrated confidence measure indicating the reliability of the prediction, and enforces minimum confidence thresholds that trigger principled abstention or substitution when prediction certainty is insufficient. This confidence-aware approach enables the system to distinguish between high-confidence safe predictions, high-confidence unsafe predictions requiring intervention, and low-confidence predictions requiring conservative handling, thereby providing more nuanced and reliable safety enforcement than systems that evaluate only harm magnitude without considering prediction reliability.

According to an embodiment, the systems and methods described herein additionally provide governance-grade monitoring with automatic triggers for corrective action. A monitoring and audit pipeline computes safety key performance indicators including near-miss event frequencies, calibration error metrics, and distribution drift signals, writes audit-grade logs suitable for compliance reporting and post-hoc investigation, and generates automatic triggers that drive recalibration of harm predictors, rollback to prior model versions when safety degradation is detected, and controlled rollout of model updates with staged deployment and validation. This monitoring and trigger architecture provides traceability, operational safety assurance, and automated maintenance capabilities not taught by conventional content moderation layers or rule-based filtering systems, which typically lack quantitative safety metrics, formal audit trails, and mechanisms for triggering model updates in response to observed safety performance.

The systems and method described herein provide several technical advantages over prior art approaches to AI safety. The system provides end-to-end guarantees by combining training-time constraints that reduce unsafe action proposals, runtime shielding that prevents residual constraint violations, and continuous calibration that preserves reliability under distribution drift and changing operational conditions. The system provides defense-in-depth through multi-tier constraints including chance constraints, tail-risk constraints, and cumulative harm constraints, augmented by confidence gating and substitution/abstention mechanisms that provide layered protections against harmful actions. The system provides operational scalability with privacy preservation through federated calibration that improves fleet-wide harm prediction accuracy without centralizing sensitive telemetry data, thereby satisfying privacy and regulatory requirements in distributed deployments. The system provides auditability and operational control through versioned model artifacts, tamper-evident audit logs, and release gatekeeping mechanisms that enable compliance reporting, incident response, and rapid rollback to prior safe versions when safety degradation is detected. The system further provides domain-agnostic applicability, enabling deployment across autonomous control systems, transactional systems, generative AI applications, and tool-calling frameworks through the use of domain-specific harm functionals and safe-action repositories that adapt the core safety framework to diverse operational contexts and risk profiles.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for enforcing a no-harm directive in an artificial intelligence system, according to an embodiment. According to the embodiment, the system architecture 100 is configured to mediate actions proposed by a learned policy using a harm estimation pathway and a runtime enforcement pathway, such that an executed action is permitted, substituted, or suppressed based on one or more harm constraints. System 100 may be implemented using one or more computing devices including processors, memory, and network interfaces, and the depicted functional blocks may be implemented as software modules, services, libraries, virtual machines, containers, hardware accelerators, or combinations thereof, depending on the deployment context.

According to the embodiment, an environment (e.g., an AI-controlled system) 110 represents a target environment in which actions are executed and outcomes are observed. Environment 110 may comprise, by way of example and without limitation, a robotic system, an autonomous vehicle subsystem, an industrial control process, an information retrieval or content generation system, a transaction execution service, a decision-support system, or a simulated environment used for training and/or evaluation. An environment interface 112 is configured to obtain state and context information from environment 110 and to present such information to one or more downstream components in a normalized form. For example, environment interface 112 may perform one or more of: feature extraction, state estimation, prompt or request parsing, sensor fusion, context assembly, authentication and session binding, and/or formatting of inputs into a representation suitable for inference. Environment interface 112 is further configured to convey an executed action (or a control output) back to environment 110, including cases where the executed action is a substituted safe action or a no-action (abstention) decision.

A policy module 120 is configured to receive processed state or context information and to generate a candidate action. Policy module 120 may implement a reinforcement-learning policy, a supervised policy, a planning policy, a generative model output policy, a tool-calling policy, or another control policy that maps inputs to actions. In some embodiments, policy module 120 produces an action representation that includes one or more of: a discrete action selection, continuous control parameters, an action plan, a sequence of tool invocations, a natural-language response, a structured command, or a transaction specification. The candidate action produced by policy module 120 is provided to a safety enforcement module 140 and, in some embodiments, is also made available to a harm predictor 130 for harm scoring in view of the current state/context.

Harm predictor 130 is configured to estimate harm associated with a candidate action under the present state/context, and to output a harm estimate that can include both a harm score and a confidence measure (or uncertainty measure). Harm predictor 130 may implement a learned model such as a neural network, an ensemble, a probabilistic model, a calibrated classifier, a regressor, or a hybrid model, and may evaluate harm in terms of expected harm magnitude, probability of exceeding a harm threshold, a tail-risk metric, or another harm functional compatible with enforcement objectives. In some embodiments, a human-value utility function module 132 provides auxiliary inputs to harm predictor 130 and/or policy module 120, such as preference signals, normative constraints, domain rules, or value-alignment features, to support disambiguation of context-dependent harms and to improve the stability of harm estimation across different operational contexts. A no-harm constraint policy (e.g., thresholds) module 134 stores or provides constraint parameters used to evaluate the harm estimate, including, by way of example and without limitation, per-domain harm thresholds, probability bounds, confidence thresholds, cumulative harm limits, tiered risk tolerances, and/or exception-handling rules. No-harm constraint policy module 134 may be static, configurable by an operator, selected based on a deployment profile, or updated over time as described herein.

Safety enforcement module 140 is configured to receive the candidate action from policy module 120, to receive harm estimation outputs from harm predictor 130, and to evaluate whether executing the candidate action is permissible under no-harm constraint policy 134. According to the embodiment, safety enforcement module 140 performs a runtime check that can incorporate one or more of: a comparison of a harm score to a threshold, evaluation of a probability of harm against a chance constraint, evaluation of confidence/uncertainty against a minimum-confidence rule, evaluation of cumulative harm budgets, and/or application of contextual guardrails. Safety enforcement module 140 may include or invoke a safety shield module 142 that implements one or more intervention modes. In some embodiments, safety shield 142 permits execution of the candidate action when constraints are satisfied; substitutes an alternative action when the candidate action violates one or more constraints but a safe alternative exists; or enforces abstention when no sufficiently safe alternative is available. Substitution may comprise selecting a safe action from a repository, constraining action parameters to a safe envelope, rewriting or redacting unsafe portions of an output, invoking a safer tool path, delaying execution pending additional context, or routing the interaction for human review. Abstention may comprise returning a refusal, initiating a safe-stop behavior, issuing a request for clarification, or generating a minimal-risk response consistent with the operational domain. The resulting executed action (including, but not limited to, an allowed action, a substituted action, or a no-action decision) is conveyed via environment interface 112 to environment 110.

Monitoring and audit module 150 is configured to capture telemetry associated with operation of overall system architecture 100. In some embodiments, monitoring and audit module 150 logs the processed state/context, candidate action, harm estimate and confidence, constraint evaluation results, enforcement decision (allow/substitute/abstain), the executed action communicated to environment 110, and observed outcomes or feedback returned from environment 110. Monitoring and audit module 150 may generate audit records suitable for post hoc review, compliance reporting, debugging, and safety validation, and may additionally compute derived safety indicators such as near-miss events, repeated abstentions, repeated substitutions, drift signals, or domain-specific harm proxies. A federated calibration module 160 is configured to receive safety telemetry (including telemetry generated by monitoring and audit module 150) and to produce calibration updates for harm predictor 130 and, optionally, policy updates for policy module 120. In some embodiments, federated calibration module 160 performs distributed calibration across multiple deployed instances by aggregating update signals (e.g., calibration residuals, summary statistics, parameter deltas, or gradient-like information) without requiring sharing of raw sensitive data, and then distributing updated calibration parameters and/or model parameters back to one or more instances. In this manner, overall system architecture 100 supports ongoing maintenance of harm estimation quality and enforcement reliability as operating conditions, domains, or data distributions change, while preserving the generality of the depicted architecture and allowing different implementations for training-time updates, runtime-only calibration, or hybrid approaches.

Figure 2:
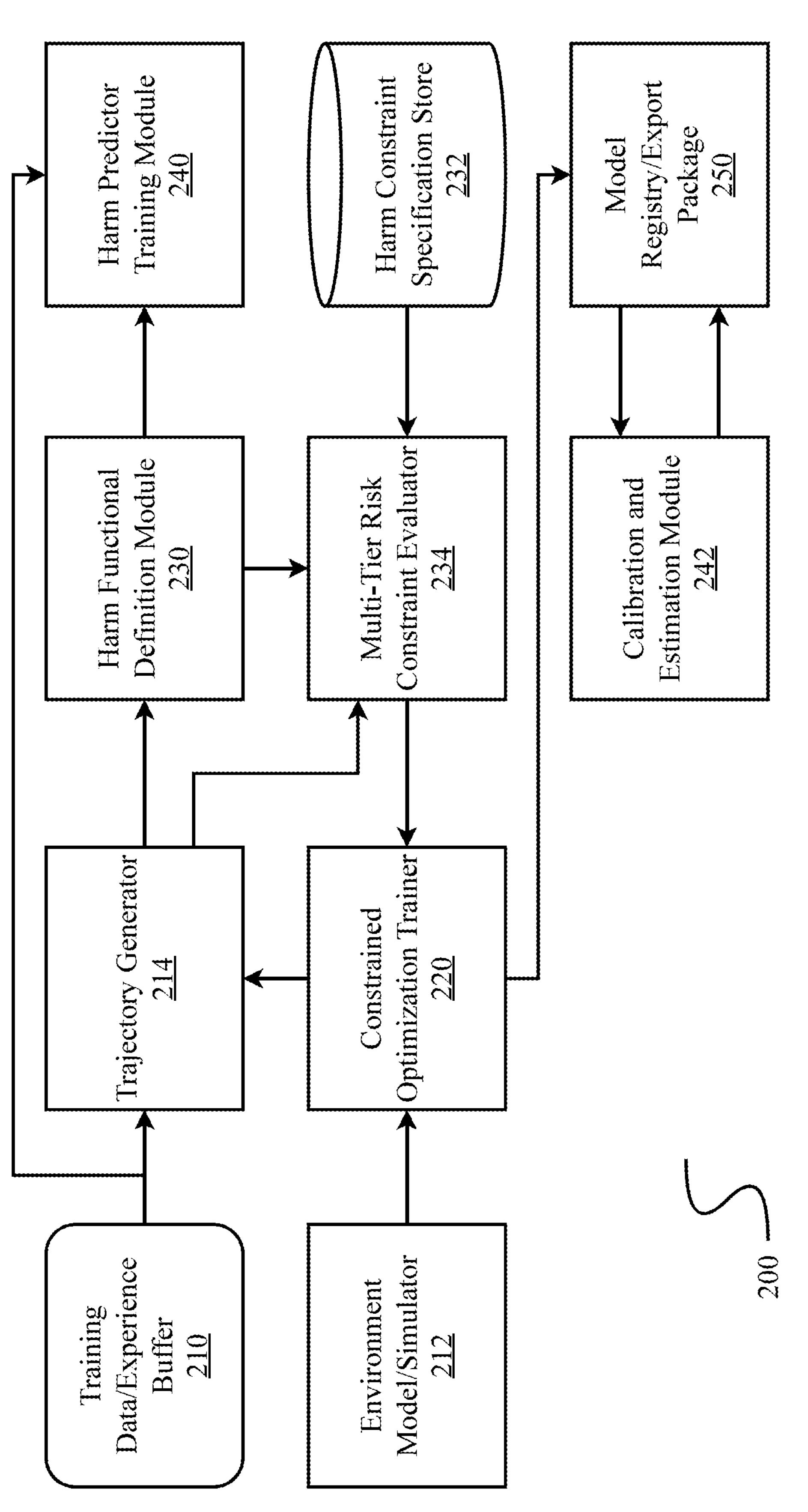
FIG. 2 is a block diagram illustrating an exemplary training and constrained-optimization system for producing one or more deployable models configured to support no-harm operation in a runtime system.

FIG. 2 is a block diagram illustrating an exemplary training and constrained-optimization system 200 for producing one or more deployable models configured to support no-harm operation in a runtime system. According to an embodiment, training and constrained-optimization system 200 supports learning and/or refining a policy under explicit harm-based constraints, learning and/or refining a harm predictor, and generating calibrated outputs suitable for runtime evaluation and enforcement. The functional blocks of training and constrained-optimization system 200 may be implemented using one or more computing devices and may be executed in a centralized training environment, a distributed training environment, a cloud-based training pipeline, an on-premises training cluster, or combinations thereof, and the illustrated flows are exemplary and may be reordered, repeated, performed in parallel, or omitted in certain embodiments.

According to the embodiment, training data/experience buffer 210 stores or provides training samples, logs, and/or experience tuples used to train and evaluate one or more models. Training data/experience buffer 210 may include, without limitation, recorded state-action-outcome traces from deployed systems, simulated rollouts, curated datasets, counterfactual examples, synthetic data, red-team or adversarial test cases, and/or human-labeled safety annotations. An environment model/simulator (optional in various embodiments) 212 provides an environment dynamics model, a simulator, a digital twin, or other mechanism to generate rollouts when direct interaction with a live environment is unavailable, unsafe, or impractical. In some embodiments, environment model/simulator 212 is used to produce additional candidate trajectories for rare, high-impact, or safety-critical scenarios, and such simulated rollouts may be combined with real-world experience stored in training data/experience buffer 210.

A trajectory generator 214 is configured to generate candidate trajectories using a current version of a policy. In some embodiments, trajectory generator 214 samples experiences from training data/experience buffer 210, optionally executes rollouts in environment model/simulator 212, or performs both, thereby producing state-action-outcome traces that represent candidate behaviors of the policy under a range of operational conditions. Trajectory generator 214 may generate trajectories by executing the policy in a loop, by sampling action proposals conditioned on stored states, by producing multiple action candidates per state, or by any other technique suitable for producing data for constrained training and risk evaluation.

A harm functional definition module 230 defines a harm measure used by training and constrained-optimization system 200 to quantify undesirable outcomes. Harm functional definition component 230 may define harm as a scalar cost, a vector of harm dimensions, a distributional measure, or a composite metric, and may incorporate domain context, severity weighting, and/or prioritization among harm categories. In some embodiments, harm functional definition component 230 provides labeling logic, scoring rules, or learned scoring models used to assign harm labels or harm scores to the state-action-outcome traces produced by trajectory generator 214. A harm constraint specification store 232 stores or provides constraint parameters and risk limits used to bound harm during learning. Harm constraint specification store 232 may include, without limitation, per-domain or per-deployment harm thresholds, probability bounds for harmful events, tail-risk bounds, cumulative harm budgets over a horizon, confidence requirements, and/or tiered constraint profiles. In some embodiments, harm constraint specification store 232 provides multiple constraint sets selectable based on a target deployment environment, a regulatory profile, or an operator configuration.

A multi-tier risk constraint evaluator 234 is configured to evaluate candidate trajectories and/or candidate actions under a plurality of harm-related constraints. In some embodiments, multi-tier risk constraint evaluator 234 computes one or more of: a chance constraint representing a bound on the probability of harm exceeding a threshold; a tail-risk metric representing a bound on extreme harm outcomes (e.g., a conditional tail expectation); and a cumulative harm constraint representing a bound on harm aggregated across a time horizon or episode. Multi-tier risk constraint evaluator 234 may output constraint residuals indicating whether constraints are satisfied, by how much they are violated, and/or which constraint tiers are active. In some embodiments, multi-tier risk constraint evaluator 234 also produces signals used to adjust training dynamics, such as dual variables, multipliers, penalty coefficients, or adaptive thresholds.

A constrained optimization trainer 220 is configured to train or update a policy subject to the harm constraints. In some embodiments, constrained optimization trainer 220 implements a primal-dual optimization process, a Lagrangian relaxation process, or another constrained optimization technique in which a policy objective is optimized while enforcing satisfaction of the multi-tier constraints evaluated by multi-tier risk constraint evaluator 234. Constrained optimization trainer 220 may update policy parameters based on gradients, policy improvement operators, or other learning signals, and may also update constraint multipliers based on constraint residuals to reduce violations over time. According to some embodiments, constrained optimization trainer 220 outputs policy updates that are fed back to trajectory generator 214, thereby enabling iterative learning cycles in which new candidate trajectories are generated using an updated policy, re-evaluated by multi-tier risk constraint evaluator 234, and used to further refine the policy.

According to some embodiments, training and constrained-optimization system 200 further trains and/or refines a harm predictor using a harm predictor training module 240. Harm predictor training module 240 may train a model to predict harm outcomes, harm probabilities, or harm distributions as a function of state/context and candidate actions, and may utilize labels or scores derived from harm functional definition component 230, from curated annotations, and/or from observed outcomes in the training data/experience buffer 210. In some embodiments, harm predictor training module 240 is trained jointly with the policy, trained separately from the policy, or trained on a different cadence than the policy, and may include techniques such as class balancing, rare-event emphasis, uncertainty estimation, and/or robustness training to improve safety coverage.

A calibration and confidence estimation module 242 is configured to calibrate outputs of the harm predictor and to generate confidence measures suitable for use in runtime enforcement. In some embodiments, calibration and confidence estimation module 242 learns a calibration mapping that converts raw harm predictor scores into calibrated probabilities or calibrated risk estimates, and additionally computes a confidence or uncertainty signal that can be used to enforce minimum-confidence requirements or conservative decision rules. Calibration and confidence estimation module 242 may be applied post-training, during training, periodically during retraining, or continuously as new data is accumulated, and may use held-out validation data, cross-validation, online calibration statistics, or other calibration techniques.

A model registry/export package 250 is configured to store, version, and package deployable outputs produced by training and constrained-optimization architecture 200. In some embodiments, model registry/export package 250 stores one or more trained policy parameter sets, one or more trained harm predictor parameter sets, and one or more calibration artifacts or confidence models produced by calibration and confidence estimation component 242, along with metadata such as training provenance, constraint profiles, evaluation results, and deployment compatibility information. Model registry/export package 250 may export or publish the trained artifacts for deployment to a runtime system (e.g., system 100), and may further support selecting among multiple policy variants or constraint profiles, rolling back to a prior version, or deploying different calibrated harm predictors for different domains.

In operation, training and constrained-optimization system 200 enables an implementer to train a policy that proposes actions while incorporating explicit harm constraints, to train and calibrate a harm predictor that provides harm estimates and confidence measures, and to generate deployable artifacts that support runtime no-harm enforcement. While FIG. 2 illustrates one exemplary arrangement, in other embodiments one or more components may be combined, separated, replicated, executed on different compute nodes, or implemented using alternative learning approaches, provided that the resulting system produces (i) a policy capable of proposing candidate actions, (ii) a harm estimation model capable of producing calibrated harm risk outputs, and (iii) constraint artifacts usable to enforce a no-harm directive during deployment.

Figure 3:
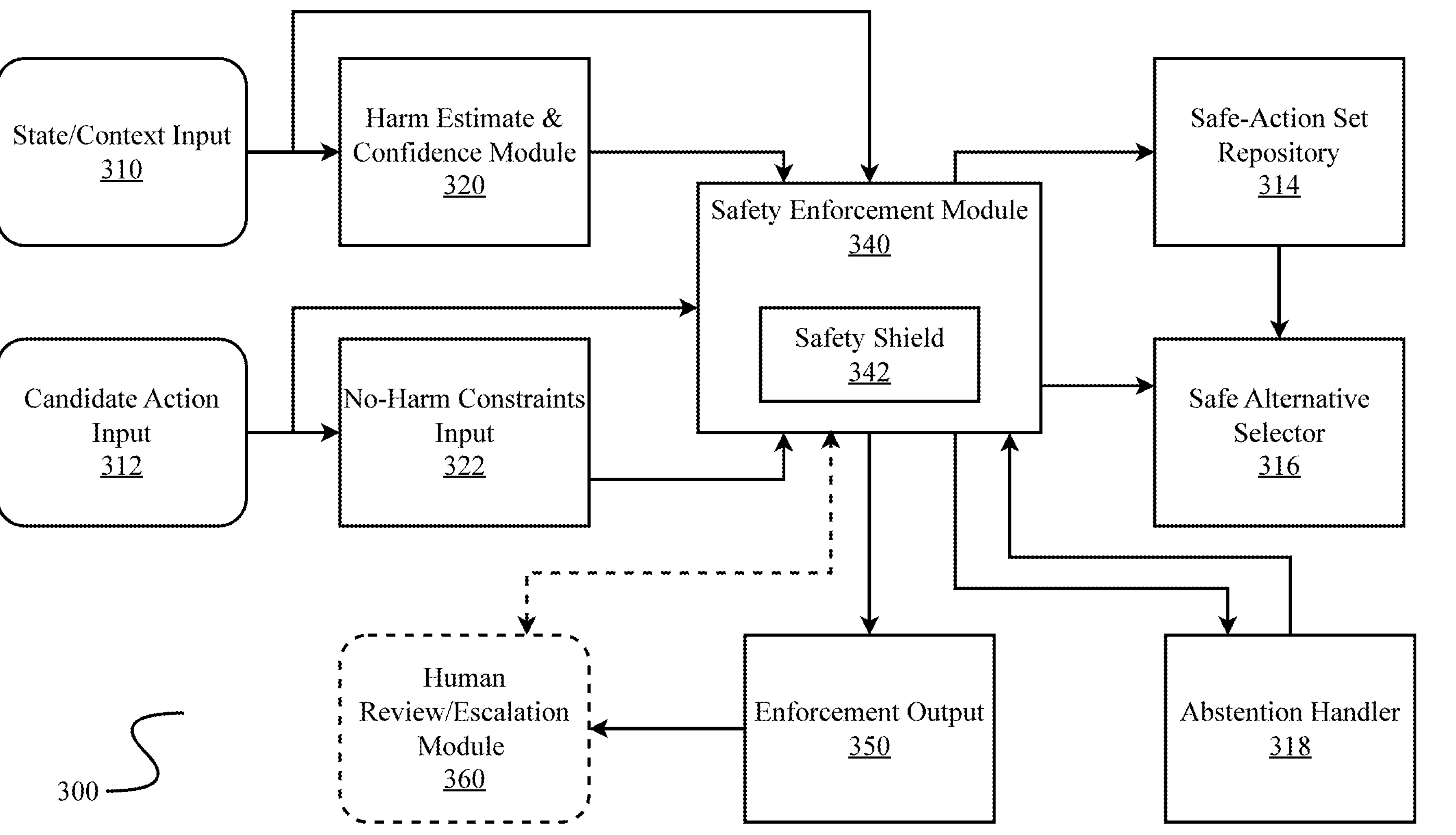
FIG. 3 is a block diagram illustrating an exemplary runtime safety enforcement system for evaluating and controlling actions proposed by an artificial intelligence policy under a no-harm directive.

FIG. 3 is a block diagram illustrating an exemplary runtime safety enforcement system 300 for evaluating and controlling actions proposed by an artificial intelligence policy under a no-harm directive. Runtime safety enforcement system 300 may be implemented as part of, or in communication with, a runtime system such as overall system architecture 100 of FIG. 1, and is configured to receive a candidate action and relevant context, evaluate harm risk under one or more constraints, and output an enforcement result that permits execution, substitutes a safer action, or enforces abstention. The functional blocks of runtime safety enforcement system 300 may be implemented as software modules, services, middleware, inference-time interceptors, policy wrappers, or other runtime components executing on one or more computing devices.

According to the embodiment, a state/context input 310 provides current context information associated with an interaction or control cycle. State/context input 310 may include, without limitation, sensor readings, system state variables, user request content, session metadata, operational constraints, and/or environmental conditions. A candidate action input 312 provides a candidate action proposed by an upstream policy (e.g., policy module 120 of FIG. 1). Candidate action input 312 may represent a discrete action, a continuous control command, a planned sequence, a tool invocation, a transaction, or an output response, depending on the deployment domain. In some embodiments, runtime safety enforcement system 300 receives both state/context input 310 and candidate action input 312 contemporaneously, and treats the pair as an evaluation tuple for harm assessment and constraint checking.

A harm estimate and confidence input module 320 provides a harm-related output generated by a harm predictor (e.g., harm predictor 130 of FIG. 1). Harm estimate and confidence input 320 may include a harm score, an estimated probability of exceeding a harm threshold, a distributional risk estimate, and/or a confidence or uncertainty value indicating reliability of the harm prediction under the present context. A no-harm constraints input 322 provides one or more thresholds, budgets, and/or constraint parameters used to determine whether the candidate action is permissible. No-harm constraints input 322 may include, without limitation, per-action harm thresholds, bounds on probability of harmful outcomes, confidence thresholds requiring conservative handling when uncertainty is high, cumulative harm budgets over a time window, and/or domain-specific constraint profiles. In some embodiments, no-harm constraints input 322 is selected based on deployment context and may vary dynamically based on mode, user role, operational conditions, or other configuration signals.

A safety enforcement module 340 is configured to receive the state/context input 310, candidate action input 312, harm estimate and confidence input 320, and no-harm constraints input 322, and to determine an enforcement decision. In some embodiments, safety enforcement module 340 evaluates whether the candidate action satisfies a constraint set by applying one or more decision rules, such as comparing a harm score to a threshold, comparing a predicted harm probability to a chance-constraint bound, applying a tail-risk rule, verifying that confidence meets a minimum-confidence criterion, and/or evaluating whether cumulative harm budgets remain within bounds. Safety enforcement module 340 may apply conservative decisioning, such that increased uncertainty causes tighter enforcement or triggers substitution or abstention.

In some embodiments, safety enforcement module 340 comprises or invokes a safety shield 342 configured to implement intervention behaviors. Safety shield 342 may perform an interception operation that blocks execution of a candidate action when constraints are violated, and may further determine whether to substitute an alternative action or to abstain. In some embodiments, safety shield 342 executes substitution by consulting a safe-action set repository 314 and selecting an alternative action that is expected to satisfy the no-harm constraints. Safe-action set repository 314 may store predetermined safe actions, parameter-bounded actions, safe templates, safe tool invocation patterns, or domain-specific safe responses. Safety shield 342 may invoke a safe alternative selector 316 to choose, rank, and/or construct a substitute action, for example by selecting a minimally disruptive alternative, constraining action parameters into a safe envelope, rewriting or redacting unsafe portions of an output, or choosing a different tool path. Safe alternative selector 316 may, in some embodiments, use state/context input 310, harm estimate and confidence input 320, and no-harm constraints input 322 to evaluate multiple candidate substitutes before returning a selected substitute action for enforcement.

If no substitute action can be identified that satisfies the no-harm constraints, safety shield 342 may invoke an abstention handler 318 to enforce abstention. Abstention handler 318 may produce an abstain result that includes a refusal, a safe-stop command, a delay-and-request-more-information response, an escalation trigger, or another low-risk output consistent with the domain. In some embodiments, abstention handler 318 additionally triggers safety events for logging and monitoring, or initiates a safe-state transition in a physical system. The resulting enforcement output 350 represents the final runtime output of runtime safety enforcement system 300, and may comprise an executed action (when allowed), a substituted action (when a safe alternative is selected), or an abstention output (when execution is suppressed). Enforcement output 350 may be forwarded to a downstream execution pathway, such as an environment interface, tool execution layer, or actuator control layer.

In some embodiments, runtime safety enforcement system 300 further comprises a human review/escalation module 360 that may be invoked optionally. Human review/escalation component 360 may be used when a candidate action is repeatedly blocked, when confidence is below a threshold, when the context indicates a high-stakes scenario, or when a domain-specific policy requires human involvement. In such embodiments, safety enforcement module 340 may route an escalation request to human review/escalation component 360, and may receive guidance, an override, or an approved substitute action, subject to configured governance rules. Human review/escalation component 360 is depicted as optional, and may be omitted, replaced with automated supervisory logic, or integrated with an operations console, depending on the implementation.

In operation, runtime safety enforcement system 300 enables an implementer to apply enforceable no-harm control at runtime by evaluating harm risk and constraints for a candidate action, intercepting unsafe actions, selecting safe alternatives when available, and abstaining when necessary. While FIG. 3 illustrates one exemplary arrangement, in other embodiments one or more components may be combined, separated, replicated across services, or implemented using different decision strategies, provided that the runtime system evaluates a proposed action under harm-based constraints and produces an enforcement output that prevents execution of actions that violate a configured no-harm directive.

Figure 4:
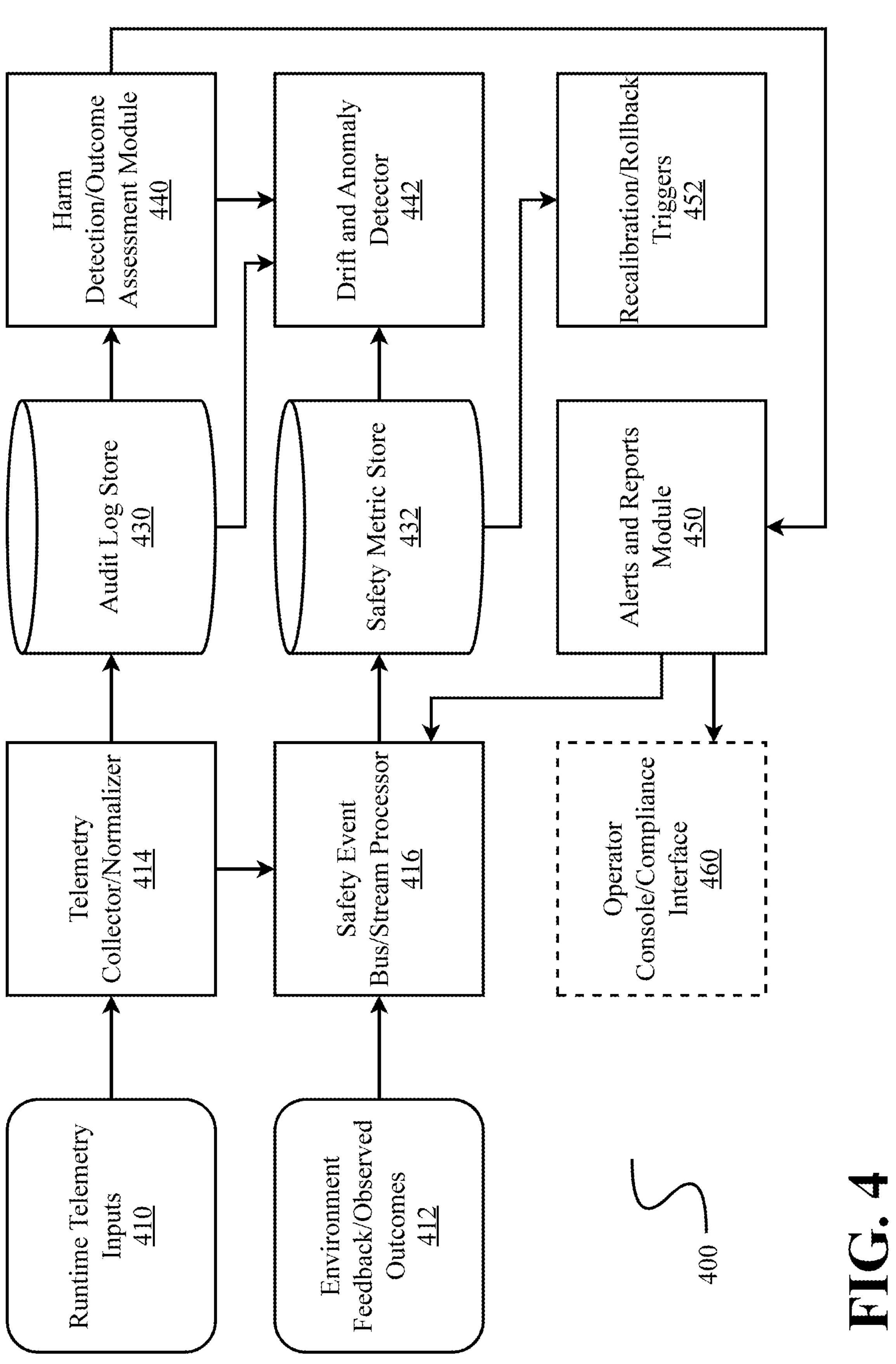
FIG. 4 is a block diagram illustrating an exemplary monitoring, audit, and outcome assessment system for collecting and analyzing safety-relevant telemetry generated during operation of a no-harm AI control system, according to an embodiment.

FIG. 4 is a block diagram illustrating an exemplary monitoring, audit, and outcome assessment system 400 for collecting and analyzing safety-relevant telemetry generated during operation of a no-harm AI control system, according to an embodiment. Monitoring, audit, and outcome assessment system 400 is configured to capture runtime inputs and decisions, correlate such data with observed outcomes, generate audit-grade records, compute safety metrics, and produce triggers and reports usable to maintain or improve no-harm compliance over time. The functional blocks of monitoring, audit, and outcome assessment system 400 may be implemented as software services, logging pipelines, stream-processing jobs, databases, and analytics modules executing on one or more computing devices, and may operate in real time, near real time, batch mode, or combinations thereof.

According to the embodiment, runtime telemetry inputs 410 provide structured and/or semi-structured telemetry generated by a runtime stack implementing the no-harm control framework. Runtime telemetry inputs 410 may include, without limitation, state/context features, a candidate action, harm estimates and confidence measures, constraint evaluation results, enforcement decisions (e.g., allow/substitute/abstain), and an executed or substituted action actually transmitted for execution. Environment feedback/observed outcomes 412 provide signals representing what occurred after execution (or after abstention), and may include acknowledgements, completion events, sensor measurements, downstream system responses, user feedback, error codes, incident reports, or other outcome indicators. In some embodiments, environment feedback/observed outcomes 412 include both immediate outcomes and delayed outcomes, and may further include proxy signals for harm such as complaints, policy violations, rollback events, anomalies, or third-party safety signals.

A telemetry collector/normalizer 414 is configured to ingest runtime telemetry inputs 410 and environment feedback/observed outcomes 412 and to normalize the ingested data into one or more consistent event formats. Telemetry collector/normalizer 414 may perform one or more of: schema normalization, field extraction, timestamping, identifier assignment, correlation key generation, redaction, sampling, compression, aggregation, and/or enrichment with metadata such as model version identifiers, constraint profile identifiers, deployment identifiers, and session identifiers. In the illustrated embodiment, telemetry collector/normalizer 414 produces a structured log stream suitable for durable storage and analysis and may further extract safety-relevant events for downstream streaming pipelines.

A safety event bus/stream processor 416 is configured to receive normalized events and to route or transform such events for downstream storage and analytics. In some embodiments, safety event bus/stream processor 416 performs event extraction, categorization, and/or fan-out, such that different downstream components receive only the event categories needed for their functions. For example, safety event bus/stream processor 416 may generate metric update events, incident events, near-miss events, and/or audit events, and may apply filtering or throttling policies to manage volume while preserving safety-critical evidence.

An audit log store 430 is configured to store audit-grade records derived from normalized telemetry. Audit log store 430 may comprise an append-only log, a tamper-evident datastore, a write-once storage tier, or another storage mechanism configured to preserve integrity and traceability of recorded enforcement decisions and associated context. In some embodiments, audit log store 430 stores, for each control cycle or interaction, one or more of: an input context identifier, a candidate action representation, a harm estimate and confidence, applicable constraint identifiers, an enforcement decision and rationale metadata, an executed action representation (or abstention indicator), and references to observed outcome events. Audit log store 430 may support query, retrieval, and export operations for compliance, debugging, incident response, or verification.

A safety metrics store 432 is configured to store computed metrics and counters derived from runtime and outcome events. Safety metrics store 432 may include, without limitation, rates of substitutions, rates of abstentions, constraint violation rates, near-miss frequencies, distributions of predicted harm risk, calibration error measures, and domain-specific safety KPIs. In some embodiments, safety metrics store 432 stores time-series aggregates, cohort-based aggregates by deployment or model version, and/or rolling-window statistics that support trend analysis and drift detection.

A harm detection/outcome assessment module 440 is configured to analyze audit records and outcomes to determine whether harm occurred, whether a harmful outcome was averted, and/or whether the harm estimation and enforcement pipeline behaved as intended. Harm detection/outcome assessment module 440 may implement deterministic rules, learned classifiers, anomaly heuristics, or combinations thereof, and may incorporate delayed outcome signals and correlation logic to map outcomes back to candidate actions and enforcement decisions. In some embodiments, harm detection/outcome assessment module 440 generates findings such as confirmed harm events, suspected harm events, false positive enforcement events, false negative enforcement events, and/or policy-quality indicators, and may annotate audit records with such findings for later review.

A drift and anomaly detector 442 is configured to detect changes in operating conditions and/or model behavior that may affect safety performance. Drift and anomaly detector 442 may evaluate one or more of: changes in input feature distributions, shifts in harm predictor confidence, increases in substitution or abstention rates, increases in disagreement between predicted harm and observed outcomes, emergence of new event categories, or other indicators of distribution shift, data quality issues, or adversarial conditions. In some embodiments, drift and anomaly detector 442 consumes signals from safety metrics store 432, audit log store 430, harm detection/outcome assessment component 440, or combinations thereof, and generates anomaly events or drift scores.

An alerts and reports module 450 is configured to produce notifications, dashboards, summaries, and/or periodic reports based on findings and detected conditions. Alerts and reports module 450 may generate real-time alerts for high-severity events, periodic compliance reports, operational dashboards, and/or incident timelines. In some embodiments, alerts and reports component 450 routes alerts to an operator console/compliance interface 460 (optional in some embodiments) to support human review, governance workflows, and configuration adjustments. Operator console/compliance interface 460 may provide access controls, audit queries, visualization of enforcement decisions and outcomes, and configuration interfaces for policy or constraint profiles, and is depicted as optional because some embodiments may operate without an interactive console.

A recalibration/rollback triggers module 452 is configured to generate trigger outputs for downstream calibration or update pipelines when safety degradation or drift is detected. In some embodiments, recalibration/rollback triggers module 452 emits triggers based on thresholds or rules applied to safety metrics, drift scores, and/or harm assessment findings, such as triggers to recalibrate a harm predictor, retrain or fine-tune a policy, tighten a constraint profile, roll back to a prior model version, or initiate additional testing. Recalibration/rollback triggers module 452 may provide outputs to a calibration system (e.g., FIG. 5) and/or a model update and rollout system (e.g., FIG. 6), and may include metadata identifying the affected deployment, model version, constraint profile, and supporting evidence references.

In operation, monitoring, audit, and outcome assessment system 400 enables an implementer to maintain no-harm compliance by preserving traceable records of runtime decisioning, correlating decisions with outcomes, quantifying safety performance over time, detecting drift and anomalies, and driving corrective actions through recalibration and controlled model updates. While FIG. 4 illustrates one exemplary arrangement, in other embodiments one or more components may be combined, separated, replicated, or implemented using alternative storage and analytics technologies, provided that the system produces auditable logs and safety-relevant signals sufficient to support monitoring, verification, and maintenance of the no-harm directive during deployment.

Figure 5:
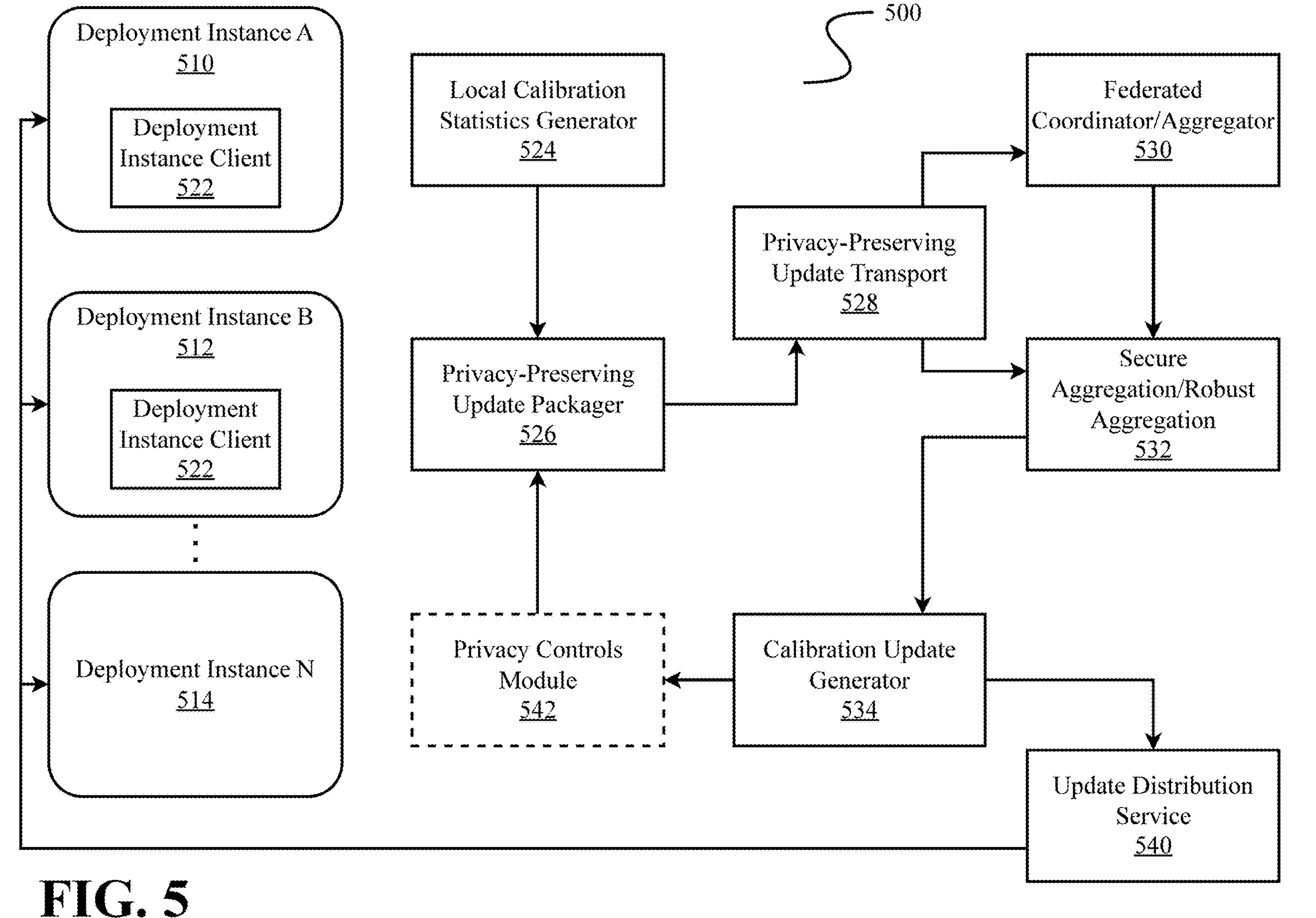
FIG. 5 is a block diagram illustrating an exemplary federated calibration and distributed update system architecture for maintaining and improving harm prediction calibration and no-harm enforcement performance across a plurality of deployed runtime instances.

FIG. 5 is a block diagram illustrating an exemplary federated calibration and distributed update system architecture 500 for maintaining and improving harm prediction calibration and no-harm enforcement performance across a plurality of deployed runtime instances. Federated calibration and distributed update system 500 may be used in connection with overall system 100 and monitoring, audit, and outcome assessment system 400, and is configured to collect locally derived calibration signals from distributed deployments, aggregate such signals in a privacy-preserving manner, generate calibration updates, and distribute updates back to the deployments. The functional blocks of federated calibration and distributed update system 500 may be implemented using one or more computing devices and may operate as a centralized federation service, a hierarchical federation service, a peer-assisted federation service, or combinations thereof.

According to an embodiment, deployment instance A 510 and deployment instance B 512 represent separate runtime deployments of a no-harm AI control system, which may be located at different sites, executed on different devices, or operated under different environmental conditions. A deployment instance N 514 indicates that any number of additional deployments may participate. Each deployment instance may include or be coupled to a deployment-instance client (e.g., local calibration) 522 configured to derive local calibration signals based on runtime behavior, observed outcomes, and/or monitoring telemetry. In some embodiments, deployment-instance client 522 interfaces with a monitoring pipeline or audit logs to obtain relevant safety telemetry, and computes local statistics describing calibration quality, risk prediction error, abstention/substitution rates, constraint activation rates, or other indicators relevant to maintaining reliable harm estimation.

A local calibration statistics generator 524 is configured to produce local summary statistics suitable for sharing with a federated service without exposing raw sensitive data. Local calibration statistics generator 524 may compute, without limitation, binned calibration curves, expected calibration error metrics, confusion-matrix summaries for harm event detection, quantile summaries of predicted harm, residual statistics comparing predicted risk to observed outcomes, and/or stratified statistics by context category or deployment mode. In some embodiments, local calibration statistics generator 524 generates multiple sets of summaries corresponding to different harm categories, different constraint profiles, or different confidence tiers.

A privacy-preserving update packager 526 is configured to package local statistics into update packets for transmission to a federated service. In some embodiments, privacy-preserving update packager 526 applies one or more privacy controls and security protections when forming the update packets, such as compression, clipping, hashing, encryption, signing, and/or inclusion of minimal metadata needed for aggregation. A privacy controls module 542 (optional in some embodiments) provides policies and mechanisms used to apply privacy-preserving transformations to local statistics prior to transmission. Privacy controls component 542 may, in various embodiments, implement differential privacy noise injection, sensitivity clipping, secure enclaves, encryption, secret sharing, or other mechanisms to reduce disclosure risk while still enabling useful aggregation. Privacy controls component 542 is depicted as optional to indicate that some embodiments may rely on transport security and aggregation policies without applying additional privacy transformations, while other embodiments may employ one or more privacy techniques depending on regulatory or operational requirements.

A privacy-preserving update transport 528 is configured to transmit update packets from distributed deployments to a federation service. Privacy-preserving update transport 528 may comprise secure network transport protocols, message queues, publish/subscribe systems, or other communications mechanisms configured to provide confidentiality, integrity, and authentication. In some embodiments, privacy-preserving update transport 528 supports batching, retries, rate limits, and/or scheduling so that update transmission does not interfere with runtime control operations.

A federated coordinator/aggregator 530 is configured to orchestrate collection of update packets from participating deployments and to coordinate aggregation rounds. Federated coordinator/aggregator 530 may select which deployments participate in a given round, manage round identifiers, validate update formats, and enforce participation thresholds. In some embodiments, federated coordinator/aggregator 530 routes received update packets to a secure aggregation/robust aggregation component 532. Secure aggregation/robust aggregation component 532 is configured to aggregate update packets across deployments while limiting the ability to infer any individual deployment's raw statistics, and may additionally provide robustness against corrupted, noisy, or adversarial updates. For example, secure aggregation/robust aggregation component 532 may implement secure multi-party aggregation, threshold-based aggregation, outlier filtering, trimmed means, median-based aggregation, or other robust aggregation strategies.

A calibration update generator 534 is configured to generate one or more calibration updates based on aggregated statistics produced by secure aggregation/robust aggregation component 532. Calibration update generator 534 may produce updated calibration mappings, updated confidence estimation parameters, updated threshold recommendations, updated risk-score scaling parameters, or other calibration artifacts used to improve consistency between predicted harm risk and observed outcomes across deployments. In some embodiments, calibration update generator 534 generates distinct updates for different deployment profiles, contexts, harm categories, or model versions, and may include metadata enabling a receiving deployment to verify compatibility.

An update distribution service 540 is configured to distribute generated calibration updates back to participating deployments. Update distribution service 540 may push updates to deployments, provide updates via a pull-based mechanism, or support a hybrid approach. In some embodiments, update distribution service 540 enforces access controls, version checks, staged rollouts, rollback capability, and/or signature verification. The distributed updates are received by deployment-instance client 522 at each deployment instance and may be applied locally to improve harm predictor calibration and/or confidence estimation used by runtime enforcement. In some embodiments, updates distributed by update distribution service 540 may be applied immediately, applied after validation tests, applied according to a schedule, or applied only when a deployment enters a safe update window.

In operation, federated calibration and distributed update system 500 enables ongoing calibration improvement and safety maintenance across a fleet of deployments by collecting local calibration signals, aggregating such signals with privacy-preserving safeguards, generating calibration updates, and distributing updates back to the deployments. While FIG. 5 illustrates one exemplary arrangement, in other embodiments one or more components may be combined, separated, replicated, implemented hierarchically, or replaced with alternative federation mechanisms, provided that the architecture supports deriving local calibration signals, aggregating such signals across deployments, and distributing calibration updates usable to maintain no-harm enforcement performance over time.

Figure 6:
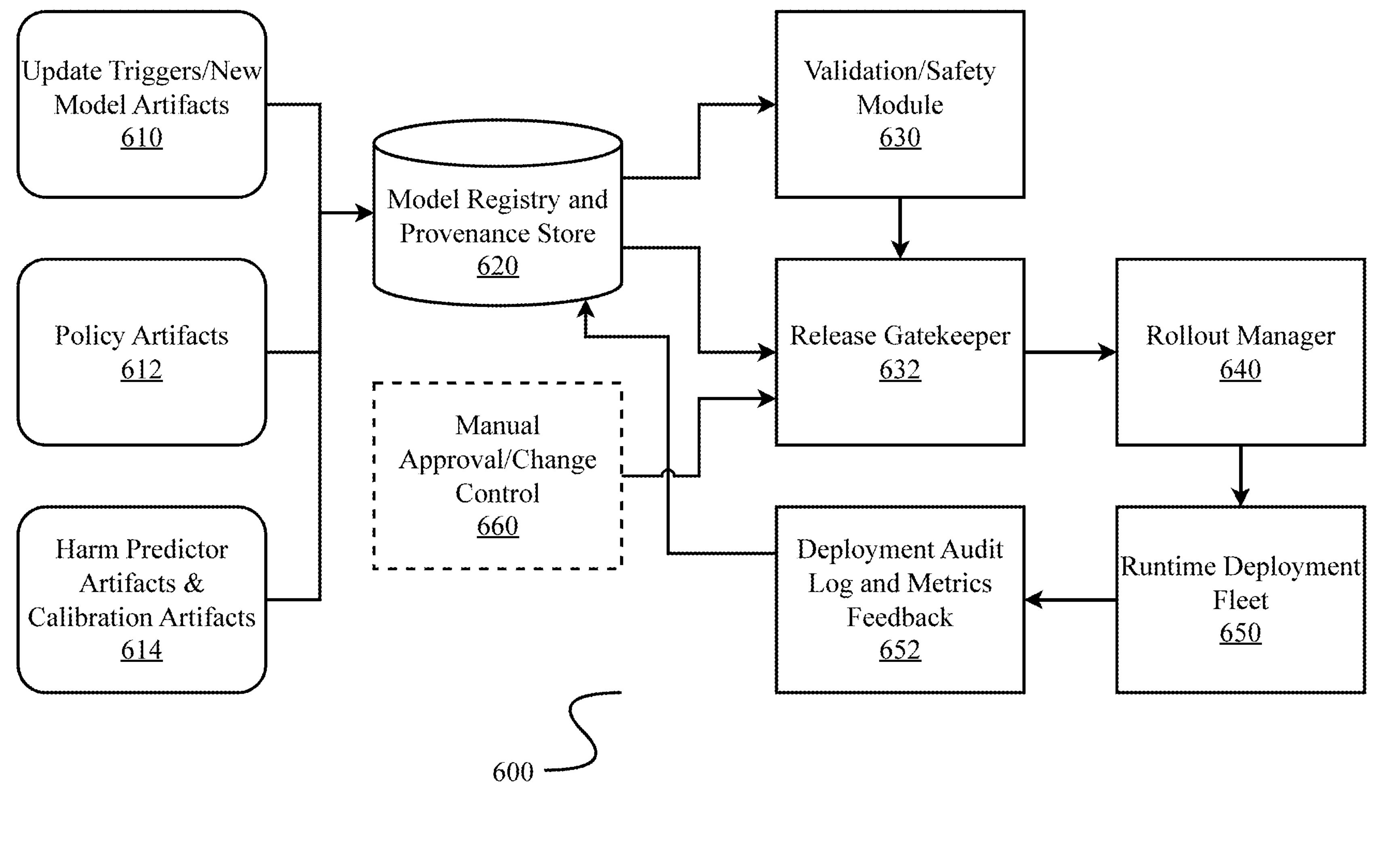
FIG. 6 is a block diagram illustrating an exemplary model update, rollout, and version control system architecture for governing deployment of updated policy artifacts and updated harm predictor artifacts (including calibration artifacts) in a no-harm AI control framework.

FIG. 6 is a block diagram illustrating an exemplary model update, rollout, and version control system architecture 600 for governing deployment of updated policy artifacts and updated harm predictor artifacts (including calibration artifacts) in a no-harm AI control framework. Model update, rollout, and version control architecture 600 may be used in connection with training and constrained-optimization system 200, monitoring, audit, and outcome assessment system 400, and federated calibration and distributed update system 500, and is configured to ingest candidate updates, preserve provenance, perform safety qualification and compatibility checks, manage controlled rollouts, and maintain deployment auditability and rollback capability. The functional blocks of model update, rollout, and version control system 600 may be implemented using one or more computing devices, and may operate as a continuous delivery pipeline, a release management service, a governance workflow, or combinations thereof.

According to an embodiment, update triggers/new model artifacts 610 represent one or more signals and/or newly produced model outputs that initiate an update cycle. Update triggers/new model artifacts 610 may be generated by a training pipeline, a calibration pipeline, a monitoring pipeline, or by operator action, and may include, without limitation, new policy versions, new harm predictor versions, updated calibration mappings, updated confidence estimation parameters, updated constraint profiles, and/or triggers indicating degraded safety performance or detected drift. Policy artifacts 612 represent one or more policy models or parameter sets suitable for runtime inference (e.g., policy module implementations). Harm predictor artifacts+calibration artifacts 614 represent one or more harm estimation models and associated calibration parameters, confidence models, and/or thresholding metadata usable for runtime harm evaluation and enforcement.

A model registry and provenance store 620 is configured to ingest and store artifacts and metadata associated with candidate releases. In some embodiments, model registry and provenance store 620 stores version identifiers, lineage information, training or calibration provenance, constraint profile identifiers, compatibility metadata, cryptographic hashes or signatures, evaluation metrics, and references to datasets or calibration rounds used to produce the artifacts. Model registry and provenance store 620 may store multiple candidate releases concurrently and may support retrieval of prior versions to enable rollbacks and comparative testing. In some embodiments, model registry and provenance store 620 provides access-controlled interfaces for registering new artifacts, approving releases, and auditing deployed versions.

A validation/safety qualification tests component 630 is configured to evaluate candidate artifacts prior to deployment. Validation/safety qualification tests component 630 may execute offline tests, simulation-based tests, replay-based tests using recorded telemetry, red-team scenario suites, regression tests, calibration quality tests, and/or constraint-violation tests to verify that candidate releases satisfy defined safety criteria. In some embodiments, validation/safety qualification tests component 630 evaluates one or more of: constraint satisfaction rates, harm prediction calibration error, abstention/substitution behavior under edge cases, robustness to distribution shift proxies, and/or compatibility with runtime interfaces. Results produced by validation/safety qualification tests component 630 may be recorded in model registry and provenance store 620 and may be used as gating inputs for release decisions.

A release gatekeeper 632 is configured to perform release approval checks and compatibility validation for a candidate release. In some embodiments, release gatekeeper 632 verifies that a candidate policy artifact is compatible with a specified harm predictor artifact, that calibration artifacts are applicable to the harm predictor version, that constraint profiles referenced by the runtime stack are present and consistent, and that required safety qualification tests have passed. Release gatekeeper 632 may further enforce governance rules such as minimum test coverage, required sign-offs, permissible deployment windows, or restrictions on model classes in certain domains. In some embodiments, release gatekeeper 632 receives an approval signal from a manual approval/change control module 660 (optional in some embodiments). Manual approval/change control module 660 may represent a human governance workflow, a change advisory board process, a compliance approval process, or an operator authorization mechanism, and is depicted as optional because some embodiments may use automated gating while other embodiments may require explicit human authorization for certain update types or deployment contexts.

A rollout manager 640 is configured to deploy an approved release in a controlled manner. In some embodiments, rollout manager 640 performs staged rollouts such as canary releases, blue/green deployments, percentage-based traffic shifting, region-by-region deployment, or device-cohort deployment, and includes rollback capability. Rollout manager 640 may deploy policy artifacts, harm predictor artifacts, calibration artifacts, and/or associated configuration updates, and may ensure that the runtime system loads a consistent set of artifacts and constraints. In some embodiments, rollout manager 640 monitors early rollout telemetry to determine whether an update should proceed, pause, or roll back.

A runtime deployment fleet 650 represents one or more runtime instances executing the no-harm control framework, such as deployments that include a policy module and a runtime safety enforcement mechanism. Runtime deployment fleet 650 receives deployed artifacts and configuration updates from rollout manager 640 and executes the updated models in operation. A deployment audit log and metrics feedback module 652 is configured to collect deployment-related telemetry and evidence produced by runtime deployment fleet 650, including deployed version identifiers, rollout state, performance metrics, safety metrics, incident signals, and other operational indicators. In some embodiments, deployment audit log and metrics feedback module 652 provides telemetry to monitoring pipelines (e.g., FIG. 4) and may further feed back evidence indicating whether a release improved or degraded safety performance, thereby contributing to subsequent update triggers. Deployment audit log and metrics feedback module 652 may additionally provide deployment provenance back to model registry and provenance store 620, enabling traceability of which versions were deployed to which runtime instances, when deployments occurred, and what validation evidence supported the release.

In operation, model update, rollout, and version control system 600 enables an implementer to manage updates to no-harm AI systems in a controlled and auditable manner by ingesting candidate artifacts and triggers, preserving provenance, qualifying candidate releases using safety validation, enforcing compatibility and governance via release gating, deploying through staged rollouts with rollback capability, and collecting deployment audit and metrics feedback to support ongoing monitoring and iterative improvement. While FIG. 6 illustrates one exemplary arrangement, in other embodiments one or more components may be combined, separated, replicated, or implemented using alternative release-management workflows, provided that the architecture supports controlled deployment of updated policy and harm prediction artifacts with traceability and safety-aware gating.

According to an embodiment, the systems described herein enable and/or utilize an exemplary method for training a no-harm algorithm (i.e., training a policy model under explicit harm constraints using iterative constrained optimization). In an exemplary embodiment, the method begins by obtaining training data and/or experience tuples (e.g., state-action-outcome records) usable to evaluate both a primary task objective and safety outcomes. The method defines a harm functional that assigns a quantitative harm score to a candidate action in a given state (and, in some embodiments, a harm score distribution or risk measure), and further defines one or more probabilistic harm constraints, including at least a constraint limiting a probability of harm and a constraint limiting tail-risk severity (e.g., a CVaR-based bound), and optionally a cumulative harm budget over a horizon. The method initializes policy parameters (e.g., θ) for a neural network policy model and initializes one or more constraint-enforcement variables (e.g., Lagrange multipliers λ), which may include distinct multipliers for respective constraint tiers.

The method then performs an iterative training loop that continues until a convergence condition is satisfied. During each iteration, the method computes (or estimates) an expected utility value for the current policy parameters with respect to a primary objective, and computes (or estimates) harm-related metrics for the current policy, including a probability of harm, a tail-risk measure for harm severity (e.g., CVaR at a selected confidence level), and optionally cumulative harm across a time window or episode. The method forms a constrained objective (e.g., a Lagrangian) that combines the primary objective with one or more constraint terms weighted by the multipliers, and updates the policy parameters using a gradient-based (or other) optimization step on the constrained objective. The method further updates the multipliers using an update rule driven by constraint residuals (e.g., increasing a multiplier when its corresponding constraint is violated), thereby steering subsequent policy updates toward satisfying the harm constraints. The loop repeats, optionally regenerating or resampling trajectories as the policy changes, until the policy satisfies constraint targets within a predefined tolerance and/or until the constrained objective stabilizes.

Upon termination of the iterative loop, the method outputs a trained no-harm policy (and, in some embodiments, associated metadata identifying the constraint profile, selected risk parameters, and convergence tolerance). In some embodiments, the method also trains a harm predictor model jointly or in parallel with the policy training, and calibrates harm prediction confidence so that runtime enforcement can rely on high-confidence harm estimates; calibration artifacts may be stored alongside the trained policy for deployment with a runtime safety enforcement module.

Figure 7:
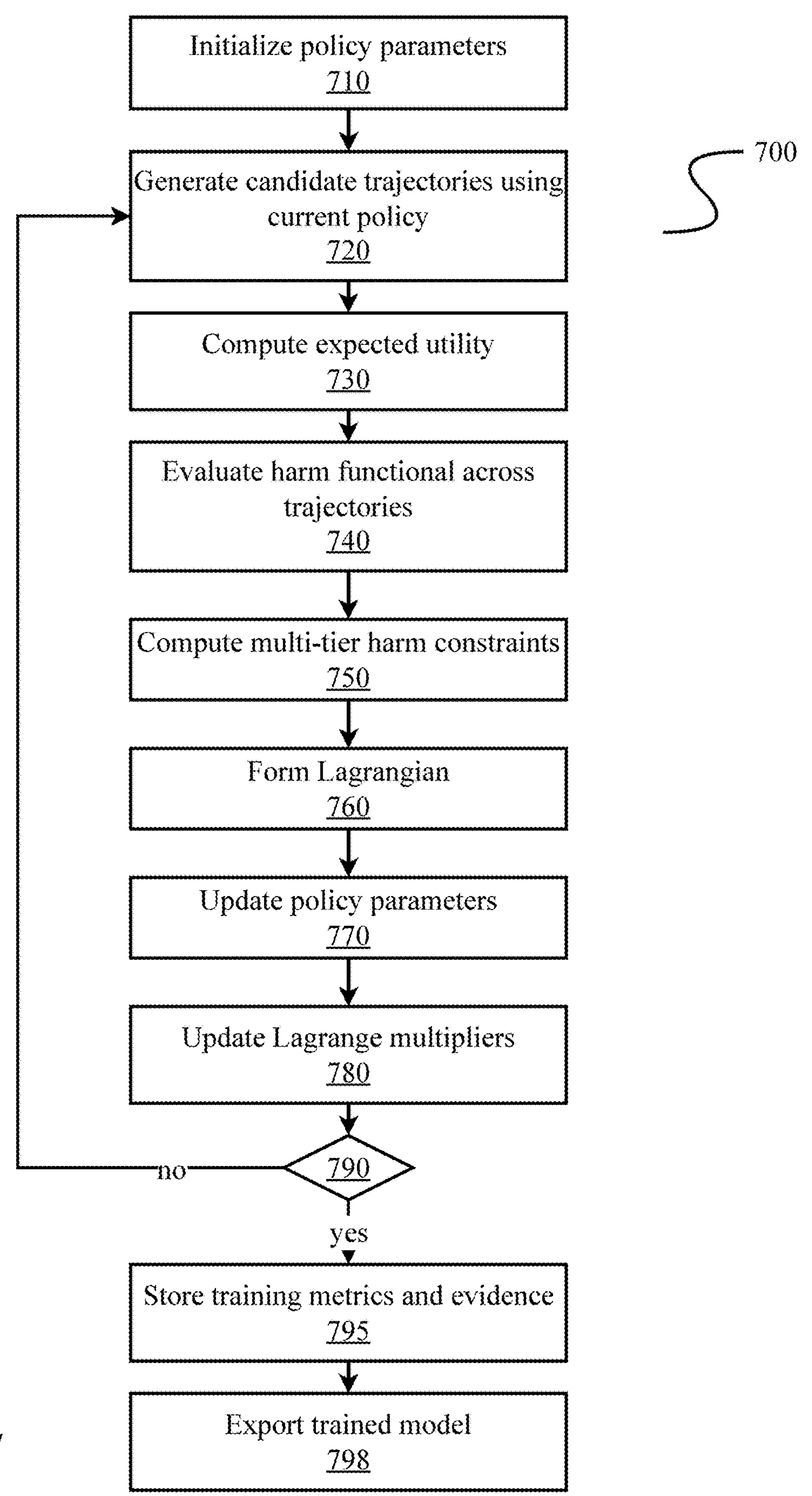
FIG. 7 is a flow diagram illustrating an exemplary method for training a policy under multi-tier harm constraints, according to an embodiment.

FIG. 7 is a flow diagram illustrating an exemplary method 700 for training a policy under multi-tier harm constraints, according to an embodiment. Method 700 enables an implementer to produce a policy that maximizes a primary utility objective while satisfying probabilistic harm constraints, thereby ensuring that the trained policy operates in compliance with a no-harm directive. Method 700 may be executed as part of training and constrained-optimization system 200, and the resulting trained policy may be deployed as policy module 120 or used in runtime safety enforcement system 300. The steps of method 700 may be performed by one or more processors executing instructions stored in a non-transitory computer-readable medium, and may be implemented in a centralized training environment, a distributed computing cluster, a cloud-based training service, or combinations thereof.

According to the embodiment, method 700 begins at step 710, in which policy parameters θ and Lagrange multipliers λ are initialized. Policy parameters θ may comprise weights and biases of a neural network policy model, parameters of a reinforcement learning policy, or other trainable parameters of a decision-making model. Lagrange multipliers λ may comprise one or more scalar values (e.g., $\lambda_1$, $\lambda_2$, $\lambda_3$) associated with respective harm constraints, and are initialized to non-negative values, which may be zero or small positive values. In some embodiments, step 710 further comprises loading training data, configuring an environment simulator, setting constraint thresholds (ε, τ, κ), and establishing convergence criteria such as a maximum number of iterations or a tolerance level for constraint satisfaction.

At step 720, candidate trajectories are generated using the current policy θ. In some embodiments, step 720 comprises executing the policy in a simulated environment or using recorded experience data to produce state-action-outcome sequences. Candidate trajectories may be generated by sampling actions from the policy conditioned on states, rolling out episodes in an environment model (e.g., environment model/simulator 212), or retrieving stored trajectories from a training data/experience buffer (e.g., 210). The number of trajectories generated may be determined by a batch size parameter, and in some embodiments, step 720 generates multiple trajectories to obtain statistically reliable estimates of expected utility and harm metrics. Candidate trajectories may include on-policy trajectories generated by the current policy, off-policy trajectories sampled from a replay buffer, or synthetic trajectories produced to emphasize rare or high-risk scenarios.

At step 730, the expected utility $E[U(\theta)]$ is computed across the candidate trajectories. Expected utility represents the primary performance objective of the policy, and may comprise, by way of example and without limitation, a cumulative reward in a reinforcement learning context, a task success rate, a quality-of-service metric, a user satisfaction score, or another domain-specific utility measure. In some embodiments, step 730 computes the expected utility by averaging a utility function over the set of candidate trajectories, and may further compute a variance or confidence interval for the utility estimate. The utility function may be predefined, learned from preference data, or derived from a reward model, and step 730 may apply temporal discounting or other transformations as appropriate for the domain.

At step 740, a harm functional $H(s,a,x)$ is evaluated across the candidate trajectories. The harm functional assigns a quantitative harm score to each state-action-outcome tuple in the trajectories, and may represent, without limitation, collision risk, policy violation severity, content toxicity, fairness violation magnitude, privacy leakage, resource consumption, financial loss, or another measure of undesirable outcomes. In some embodiments, step 740 applies a harm scoring model to each trajectory step, aggregates harm scores within episodes, and computes summary statistics such as mean harm, maximum harm, and harm distribution. The harm functional may be defined by a domain expert, learned from labeled data, derived from a cost function, or obtained from a separate harm estimation model (e.g., harm predictor 130 or harm predictor training module 240). In some embodiments, step 740 further incorporates context-dependent harm weighting, severity scaling, or categorization of harm types.

At step 750, multi-tier harm constraints are computed based on the harm evaluations from step 740. In some embodiments, step 750 computes one or more constraint metrics: (i) the probability that harm exceeds zero, $P(H>0)$, representing the likelihood of any harmful outcome; (ii) a tail-risk measure such as Conditional Value-at-Risk at a specified confidence level $\alpha$, $CVaR_a(H)$, representing the expected harm in the worst-case tail of the harm distribution; and (iii) a cumulative harm measure R, representing the total or averaged harm aggregated over a time horizon or episode. Step 750 further computes constraint violations by comparing each computed metric to a corresponding threshold: $P(H>0)$ is compared to a probability limit F, $CVaR_a(H)$ is compared to a tail-risk threshold r, and cumulative harm R is compared to a cumulative harm limit K. Constraint violations may be represented as residuals (e.g., $P(H>0)-\varepsilon$, $CVaR_a(H)-\tau$, $R-\kappa$) and may be used to update Lagrange multipliers in subsequent steps. In some embodiments, step 750 applies statistical estimation techniques to compute constraint metrics from finite trajectory samples, and may further apply confidence bounds or bias corrections to ensure conservative constraint evaluation.

At step 760, a Lagrangian $L(\theta,\lambda)$ is formed by combining the expected utility and the constraint violations weighted by Lagrange multipliers. According to an embodiment, the Lagrangian is defined as $L(\theta,\lambda)=-E[U]+\lambda_1[P(H>0)-\varepsilon]+\lambda_2[CVaR_a(H)-\tau]+\lambda_3[R-\kappa]$, where the negative sign on $E[U]$ reflects a minimization formulation. The Lagrangian combines the primary objective (maximizing utility, equivalently minimizing $-E[U]$) with penalty terms for constraint violations, and the Lagrange multipliers $\lambda_1$, $\lambda_2$, $\lambda_3$ control the relative importance of satisfying each constraint. In some embodiments, step 760 applies regularization terms, entropy bonuses, or other auxiliary objectives to the Lagrangian, and may normalize or scale terms to ensure numerical stability during optimization. The Lagrangian formulation enables simultaneous optimization of the policy and adjustment of constraint enforcement through iterative primal-dual updates.

At step 770, policy parameters $\theta$ are updated based on the gradient of the Lagrangian with respect to $\theta$. In some embodiments, step 770 performs a gradient descent update of the form $\theta\leftarrow\theta-\eta\nabla\theta L(\theta,\lambda)$, where $\eta$ is a learning rate or step size. The gradient $\nabla\theta L(\theta,\lambda)$ may be computed using automatic differentiation, policy gradient estimators, finite differences, or other gradient estimation techniques, and may incorporate variance reduction methods such as baselines, control variates, or importance sampling corrections. In some embodiments, step 770 applies gradient clipping, adaptive learning rates (e.g., using Adam, RMSprop, or other optimizers), momentum, or other techniques to improve convergence stability and speed. Step 770 may further apply trust-region constraints, proximal updates, or line search procedures to ensure that policy updates do not degrade performance excessively or violate additional stability criteria. The updated policy parameters $\theta$ represent an improved policy that better balances utility maximization against harm constraint satisfaction.

At step 780, Lagrange multipliers $\lambda$ are updated based on the gradient of the Lagrangian with respect to $\lambda$. In some embodiments, step 780 performs a gradient ascent update of the form $\lambda\leftarrow\max(0, \lambda+\eta\lambda\nabla\lambda L(\theta,\lambda))$, where $\eta\lambda$ is a learning rate for the dual variables and the $\max(0,\cdot)$ operation enforces non-negativity of the multipliers. The gradient $\nabla\lambda L(\theta,\lambda)$ equals the constraint violations $[P(H>0)-\varepsilon, CVaR_a(H)-\tau, R-\kappa]$, and thus step 780 increases a multiplier when the corresponding constraint is violated and decreases (or maintains) the multiplier when the constraint is satisfied. This dual update mechanism causes the training process to prioritize satisfying violated constraints in subsequent iterations. In some embodiments, step 780 applies adaptive step sizes, projection operations to bounded multiplier ranges, or other dual optimization techniques. The interplay between primal updates (step 770) and dual updates (step 780) implements a primal-dual optimization approach that converges to a policy satisfying the harm constraints while maximizing utility.

At decision point 790, a convergence check is performed to determine whether the training process has converged to a satisfactory solution. In some embodiments, check 790 evaluates one or more convergence criteria including, without limitation: whether constraint violations are below a predefined tolerance (e.g., all constraint residuals are less than a threshold $\delta$), whether policy parameter updates are smaller than a threshold (indicating stability), whether the Lagrangian value has stabilized across iterations, whether a maximum number of training iterations has been reached, or whether a time budget has been exhausted. Check 790 may further evaluate the quality of the policy by checking whether the expected utility exceeds a minimum acceptable threshold and whether the variance of utility or harm estimates is sufficiently low. If convergence criteria are not satisfied (decision "No" at step 790), method 700 returns to step 720 to generate new candidate trajectories using the updated policy θ, thereby initiating another iteration of the training loop. If convergence criteria are satisfied (decision "Yes" at step 790), method 700 proceeds to step 795.

At step 795, training metrics and constraint satisfaction evidence are stored for audit and validation purposes. In some embodiments, step 795 records final values of the expected utility E[U], constraint metrics P(H>0), $CVaR_{\alpha}(H)$, and R, final policy parameters θ, final Lagrange multipliers λ, the number of training iterations performed, convergence diagnostics, and references to the training data or simulator configuration used. Step 795 may further store intermediate training curves, validation performance metrics, out-of-sample constraint satisfaction rates, and metadata such as training duration, computational resources used, and hyper-parameter settings. The stored training metrics provide evidence that the trained policy satisfies the no-harm constraints and may be used for regulatory compliance, safety certification, or internal quality assurance. In some embodiments, step 795 writes the training evidence to an audit log store (e.g., audit log store 430) or a model registry (e.g., model registry and provenance store 620).

At step 798, the trained policy θ, constraint parameters, and calibration artifacts are exported for deployment. In some embodiments, step 798 packages the trained policy parameters into a deployable model format compatible with a runtime inference system (e.g., policy module 120), and includes associated metadata such as model version identifiers, training provenance, compatible harm predictor versions, and applicable constraint thresholds (ε, τ, κ). Step 798 may further export calibration artifacts such as harm predictor models, confidence estimation parameters, safe-action sets, and runtime configuration profiles. The exported artifacts may be stored in a model registry (e.g., model registry/export package 250 or 620), transmitted to a deployment system (e.g., runtime deployment fleet 650), or made available for validation and testing (e.g., validation/safety qualification tests 630). In some embodiments, step 798 applies cryptographic signing, versioning, or access controls to the exported artifacts to ensure integrity and traceability. Following step 798, method 700 terminates, having produced a trained policy that maximizes utility subject to multi-tier harm constraints and is ready for deployment in a no-harm AI control system.

In operation, method 700 enables an implementer to train an AI policy that inherently respects harm constraints through a principled constrained optimization process. By iteratively generating trajectories, evaluating harm, forming a Lagrangian, updating both policy parameters and Lagrange multipliers, and checking convergence, method 700 produces policies that provide probabilistic guarantees on harm while achieving high performance on primary objectives. While FIG. 7 illustrates one exemplary arrangement of steps, in other embodiments one or more steps may be reordered, parallelized, omitted, or combined, and additional steps such as validation on held-out data, adaptive constraint threshold adjustment, or multi-objective optimization may be incorporated, provided that the method trains a policy under explicit harm-based constraints using a constrained optimization approach.

Figure 8:
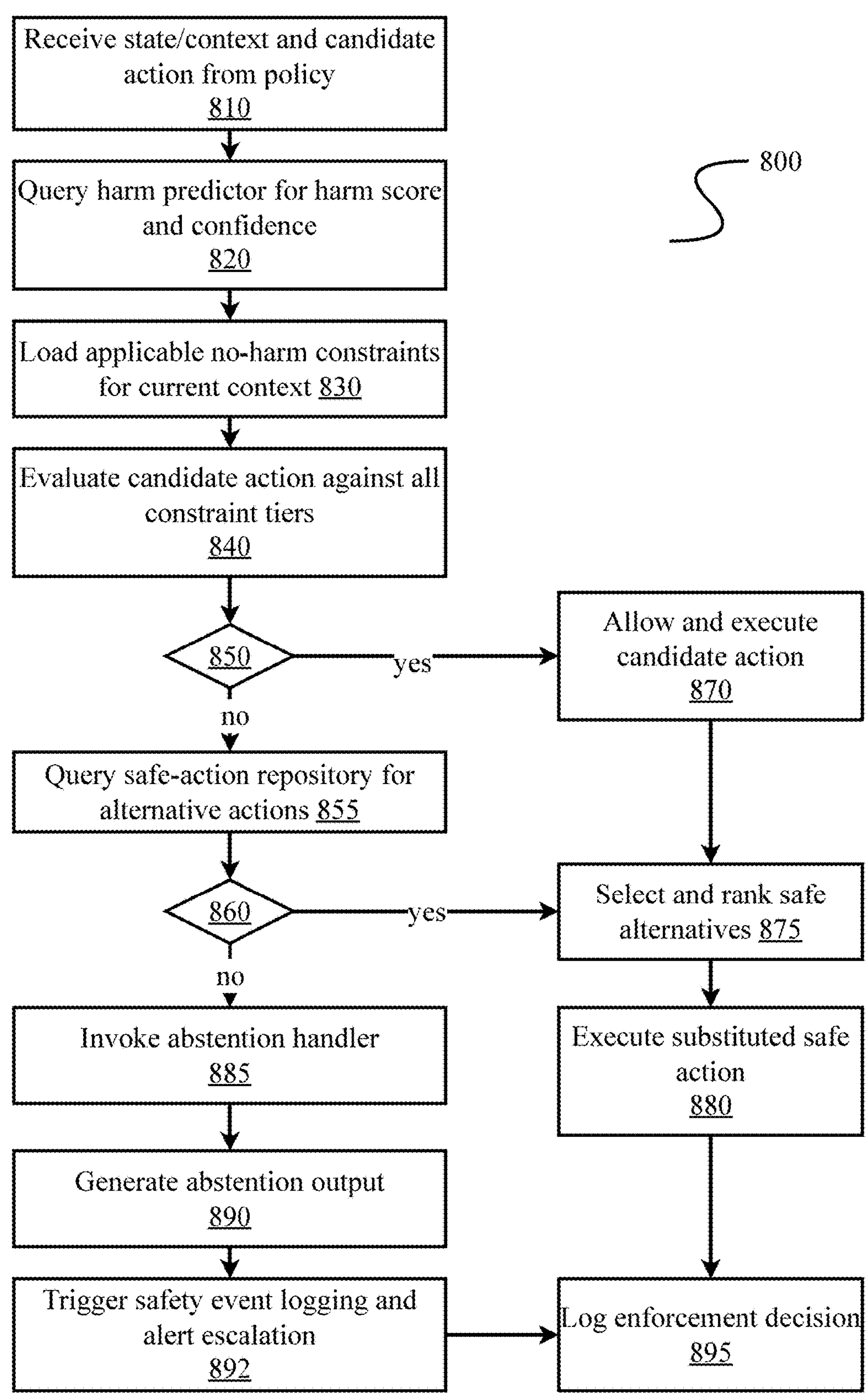
FIG. 8 is a flow diagram illustrating an exemplary method for runtime action evaluation and enforcement under a no-harm directive, according to an embodiment.

FIG. 8 is a flow diagram illustrating an exemplary method 800 for runtime action evaluation and enforcement under a no-harm directive, according to an embodiment. Method 800 enables an implementer to intercept and evaluate candidate actions proposed by a policy in real time, and to permit execution of safe actions, substitute safer alternatives when available, or enforce abstention when no safe action can be identified, thereby maintaining compliance with harm constraints during operational deployment. Method 800 may be executed as part of runtime safety enforcement system 300 or safety enforcement module 140, and operates on actions proposed by a trained policy such as policy module 120 that may have been produced by training method 700. The steps of method 800 may be performed by one or more processors executing instructions stored in a non-transitory computer-readable medium, and may be implemented as middleware, an inference-time interceptor, a policy wrapper, a safety shield service, or other runtime component executing on one or more computing devices in a production deployment environment.

According to the embodiment, method 800 begins at step 810, in which state/context information and a candidate action are received from a policy. The state/context information represents the current operational state or situational context in which a decision is being made, and may comprise, by way of example and without limitation, sensor readings, system state variables, environmental conditions, user input or request content, session metadata, transaction parameters, operational mode indicators, or any other information relevant to evaluating the appropriateness and safety of an action. The candidate action represents a proposed action generated by an upstream policy module and may comprise, without limitation, a discrete action selection, continuous control parameters, a planned action sequence, a tool invocation specification, a natural-language response, a structured command, a transaction specification, or any other representation of an operation to be executed. In some embodiments, step 810 receives the state/context and candidate action from an environment interface (e.g., environment interface 112) or directly from a policy module (e.g., policy module 120), and may normalize, validate, or preprocess the inputs to ensure compatibility with downstream evaluation components. Step 810 may further extract features from the state/context, parse structured elements of the candidate action, or retrieve additional contextual information such as user profile data, domain-specific constraints, or operational history.

At step 820, a harm predictor is queried to obtain a harm score and a confidence measure for the candidate action in the given state/context. In some embodiments, step 820 invokes a harm predictor model (e.g., harm predictor 130 or a model trained by harm predictor training module 240) by providing the state/context and candidate action as inputs, and receives as output a harm estimate that quantifies the predicted harm associated with executing the candidate action. The harm score may represent, without limitation, an expected harm magnitude, a probability of harm exceeding a threshold, a tail-risk estimate, a severity-weighted harm measure, or another harm-related metric consistent with the harm functional used during training (e.g., as defined in harm functional definition module 230). In addition to the harm score, step 820 obtains a confidence measure that indicates the reliability or certainty of the harm prediction under the current context. The confidence measure may be derived from calibration artifacts (e.g., produced by calibration and confidence estimation module 242), may represent a prediction interval width, an epistemic uncertainty estimate, a model ensemble agreement score, or another measure of prediction reliability. In some embodiments, step 820 applies calibration mappings to convert raw harm predictor outputs into calibrated probabilities or risk estimates, and may further evaluate whether the confidence level meets a minimum threshold required for reliable decision-making. If the confidence is below a threshold, step 820 may flag the prediction as uncertain and may trigger conservative enforcement rules in subsequent steps.

At step 830, applicable no-harm constraints are loaded for the current context. In some embodiments, step 830 retrieves constraint parameters from a no-harm constraint policy module (e.g., no-harm constraint policy 134) or a no-harm constraints input (e.g., 322), and selects a constraint profile appropriate for the current operational mode, domain, user role, or environmental conditions. The loaded constraints may include, without limitation, a per-action harm threshold defining a maximum acceptable harm score, a probability bound limiting the likelihood of harmful outcomes (e.g., a chance constraint), a tail-risk threshold limiting worst-case harm severity (e.g., a CVaR threshold), a cumulative harm budget limiting total harm over a time window, a minimum confidence threshold requiring high-certainty predictions for action approval, and domain-specific guardrails or contextual rules. In some embodiments, step 830 applies constraint selection logic that adapts thresholds based on context, such as applying stricter constraints in high-stakes scenarios or relaxing constraints in low-risk contexts subject to override rules. Step 830 may further retrieve constraint metadata such as constraint identifiers, versioning information, and rationale documentation to support audit and traceability.

At step 840, the candidate action is evaluated against all constraint tiers. In some embodiments, step 840 performs a multi-tier constraint check by comparing the harm score and confidence obtained at step 820 against the constraint parameters loaded at step 830. Step 840 may evaluate, without limitation: whether the harm score exceeds a harm threshold, whether a predicted probability of harm exceeds a probability bound, whether a tail-risk estimate exceeds a tail-risk threshold, whether the confidence measure meets a minimum confidence requirement, whether cumulative harm (considering prior actions in the session or time window) remains within a cumulative harm budget, and whether any domain-specific constraint rules are violated. In some embodiments, step 840 implements a conservative decision rule such that uncertainty or low confidence results in a constraint violation determination, thereby erring on the side of caution when predictions are unreliable. Step 840 may further compute a margin or safety buffer indicating how close the candidate action is to violating constraints, and may generate a constraint evaluation record documenting which constraints were checked, which constraints were satisfied, which constraints were violated, and the magnitude of any violations. The result of step 840 is a binary or multi-valued determination of whether the candidate action is permissible under the no-harm constraints.

At decision point 850, a decision is made based on whether the constraints are satisfied. If the evaluation at step 840 determines that all applicable constraints are satisfied (decision "Yes" at step 850), method 800 proceeds to step 870 to allow execution of the candidate action. If one or more constraints are violated (decision "No" at step 850), method 800 proceeds to step 855 to attempt to find a safe alternative action.

At step 870, reached when constraints are satisfied, the candidate action is allowed and executed. In some embodiments, step 870 forwards the candidate action to an execution pathway such as an environment interface (e.g., environment interface 112), an actuator control layer, a tool execution service, or an output generation module, thereby permitting the action to be carried out in the operational environment. Step 870 may additionally annotate the action with metadata indicating that it was approved by the safety enforcement mechanism, and may increment counters or update state tracking structures to maintain cumulative harm budgets or session statistics. Following execution approval at step 870, method 800 proceeds to step 895 to log the enforcement decision before terminating.

At step 855, reached when constraints are not satisfied, a safe-action repository is queried for alternative actions. In some embodiments, step 855 accesses a safe-action set repository (e.g., safe-action set repository 314) that stores or generates candidate alternative actions expected to satisfy the harm constraints. The safe-action repository may contain, without limitation, predetermined safe actions appropriate for various contexts, parameter-bounded action templates that constrain action parameters to safe ranges, safe fallback actions such as no-ops or minimal-intervention actions, rewritten or redacted versions of unsafe outputs with harmful content removed, alternative tool invocation paths that achieve similar objectives through safer means, and context-specific safe responses tailored to particular domains or scenarios. In some embodiments, step 855 queries the repository based on the current state/context, the nature of the constraint violation, and the objective or intent inferred from the candidate action, and retrieves one or more candidate safe alternatives for evaluation. Step 855 may further generate safe alternatives dynamically by applying constraint-satisfying modifications to the candidate action, such as clipping control parameters, removing unsafe elements, or selecting less aggressive action variants.

At decision point 860, a decision is made based on whether a safe alternative exists. If step 855 successfully identifies one or more candidate safe alternatives (decision "Yes" at step 860), method 800 proceeds to step 875 to select and rank the safe alternatives. If no safe alternative can be identified that satisfies the constraints (decision "No" at step 860), method 800 proceeds to step 885 to invoke an abstention handler.

At step 875, reached when safe alternatives exist, the safe alternatives are selected and ranked. In some embodiments, step 875 invokes a safe alternative selector (e.g., safe alternative selector 316) that evaluates the candidate safe alternatives to determine which alternative best balances safety and utility. The selection process may consider, without limitation, the predicted harm and confidence for each alternative (obtained by querying the harm predictor as in step 820), the utility or performance quality of each alternative relative to the original candidate action, the degree to which each alternative satisfies the user's intent or task objective, operational costs or resource consumption associated with each alternative, and domain-specific preference rules. In some embodiments, step 875 ranks the safe alternatives according to a composite scoring function and selects the highest-ranked alternative, or may apply a multi-criteria decision process. Step 875 may further verify that the selected alternative satisfies all constraint tiers by performing an evaluation analogous to step 840, and may iterate through ranked alternatives until a satisfactory safe action is identified. Following selection of a safe alternative at step 875, method 800 proceeds to step 880.

At step 880, the substituted safe action is executed. In some embodiments, step 880 forwards the selected safe alternative to an execution pathway, thereby replacing the original candidate action with the safer substitute. Step 880 may annotate the executed action with metadata indicating that a substitution occurred, may record the identity of the original candidate action and the selected substitute for audit purposes, and may update session state or cumulative harm tracking to reflect the executed action. In some embodiments, step 880 generates a user-facing explanation or notification indicating that an action was modified for safety reasons, subject to operational policies regarding transparency and user communication. Following execution of the substituted action at step 880, method 800 proceeds to step 895 to log the enforcement decision before terminating.

At step 885, reached when no safe alternative exists, an abstention handler is invoked. In some embodiments, step 885 invokes an abstention handler (e.g., abstention handler 318) configured to generate an appropriate response when the system determines that neither the candidate action nor any available alternative can be safely executed. The abstention handler may implement one or more abstention strategies including, without limitation: generating a refusal message or response indicating that the requested action cannot be performed for safety reasons, initiating a safe-stop behavior in a physical system (e.g., bringing a vehicle to a controlled stop, entering a fail-safe mode, or freezing robotic motion), issuing a request for clarification or additional information from a user or external supervisor to enable a safer action choice, triggering an escalation to human review or oversight (e.g., via human review/escalation module 360), generating a minimal-risk response consistent with the operational domain (e.g., a neutral or conservative output that avoids taking a potentially harmful action), and transitioning the system to a safe state or standby mode pending operator intervention. In some embodiments, step 885 selects an abstention strategy based on the operational context, the severity of the constraint violation, and configured governance policies. Step 885 may further provide explanatory information to assist in understanding why abstention was necessary and what conditions would need to change for an action to be permissible.

At step 890, an abstention output is generated representing a no-action decision. In some embodiments, step 890 produces a structured output or message suitable for the operational domain, such as a refusal text in a conversational system, a safe-stop command in a control system, a null action or no-op in a decision-making system, or a placeholder response indicating that processing was halted for safety reasons. Step 890 may format the abstention output according to interface requirements, may include metadata such as abstention reason codes and constraint violation details, and may generate user-facing or system-facing communication as appropriate. The abstention output produced at step 890 represents the final executed action (or lack thereof) resulting from method 800 when no safe action is available.

At step 892, safety event logging and alert escalation are triggered. In some embodiments, step 892 generates a safety event record indicating that an abstention occurred, including details such as the state/context, the candidate action that was blocked, the reasons for constraint violation, the absence of safe alternatives, and the abstention strategy applied. Step 892 may transmit the safety event to a monitoring module (e.g., monitoring and audit module 150 or monitoring, audit, and outcome assessment system 400) for logging, trend analysis, and audit purposes. In some embodiments, step 892 further triggers alert escalation by notifying operators, safety personnel, or oversight systems of the abstention event, particularly if abstentions are rare, if repeated abstentions occur within a session, if the blocked action was associated with high-stakes consequences, or if configured alerting policies require notification. Step 892 may generate real-time alerts, update operational dashboards, increment abstention counters, or invoke incident response workflows depending on the severity and context of the abstention. Following logging and escalation at step 892, method 800 proceeds to step 895.

At step 895, the enforcement decision, executed action, harm estimate, and context are logged to a monitoring system. Step 895 is reached from any of the three execution paths: the allow path (via step 870), the substitute path (via step 880), or the abstain path (via step 892), and provides a unified logging and audit mechanism for all enforcement outcomes. In some embodiments, step 895 generates a comprehensive enforcement record that includes, without limitation: the state/context received at step 810, the candidate action received at step 810, the harm score and confidence obtained at step 820, the constraint parameters loaded at step 830, the constraint evaluation results from step 840, the enforcement decision (allow, substitute, or abstain), the executed action or abstention output (i.e., the action actually carried out or the no-action result), substitution metadata if an alternative action was selected at step 875, abstention metadata if abstention was invoked at step 885, and a timestamp, session identifier, model version identifier, and other audit metadata. Step 895 transmits the enforcement record to a monitoring module (e.g., monitoring and audit module 150), where it may be stored in an audit log store (e.g., audit log store 430), used to update safety metrics (e.g., in safety metrics store 432), analyzed for drift detection (e.g., by drift and anomaly detector 442), or used to trigger recalibration (e.g., via recalibration/rollback triggers module 452). In some embodiments, step 895 further correlates the enforcement record with subsequent outcome observations to enable assessment of whether the enforcement decision achieved the desired safety outcome. Following logging at step 895, method 800 terminates, having completed the runtime evaluation and enforcement cycle for a single candidate action.

In operation, method 800 enables an implementer to enforce a no-harm directive during runtime operation by evaluating each candidate action against harm constraints, permitting safe actions, substituting safer alternatives when the original action violates constraints, and abstaining entirely when no safe action is available. The multi-tiered decision structure of method 800 provides defense-in-depth safety enforcement, and the comprehensive logging at step 895 ensures traceability and auditability of enforcement decisions. While FIG. 8 illustrates one exemplary arrangement of steps and decision branches, in other embodiments one or more steps may be reordered, parallelized, omitted, or combined, additional decision branches such as human-in-the-loop approval may be inserted, and alternative abstention strategies or substitution selection criteria may be employed, provided that the method evaluates candidate actions under harm-based constraints and produces an enforcement output that prevents execution of actions violating the no-harm directive while logging decisions for monitoring and continuous improvement.

Figure 9:
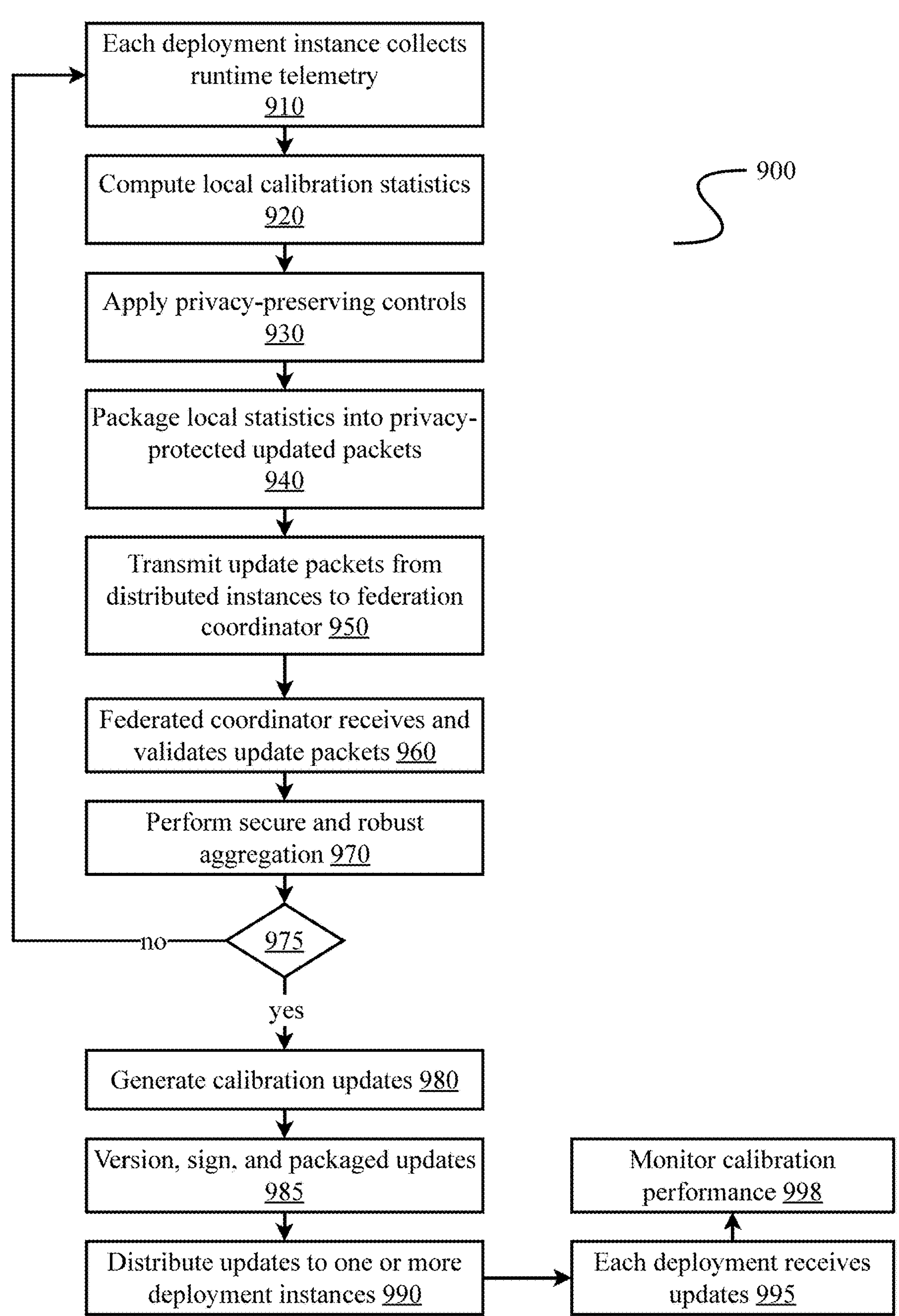
FIG. 9 is a flow diagram illustrating an exemplary method for federated harm predictor calibration, according to an embodiment.

FIG. 9 is a flow diagram illustrating an exemplary method 900 for federated harm predictor calibration, according to an embodiment. Method 900 enables an implementer to maintain and improve harm prediction calibration and confidence estimation across a plurality of distributed deployment instances by collecting local calibration signals, aggregating such signals in a privacy-preserving manner, generating calibration updates, and distributing updates back to the deployments, thereby ensuring that harm predictors remain accurately calibrated as operating conditions, domains, or data distributions change over time. Method 900 may be executed as part of federated calibration and distributed update system 500, and operates on harm predictors deployed in runtime systems such as harm predictor 130 of or harm evaluation modules used in runtime safety enforcement system 300. The steps of method 900 may be performed by one or more computing devices implementing a federated learning service, and may involve distributed computation across multiple deployment sites, a centralized federation coordinator, hierarchical federation architectures, peer-assisted federation mechanisms, or combinations thereof.

According to the embodiment, method 900 begins at step 910, in which each deployment instance collects runtime telemetry related to harm prediction performance. In some embodiments, step 910 is performed independently at each of multiple deployment instances (e.g., deployment instance A 510, deployment instance B 512, through deployment instance N 514), where each instance operates a harm predictor as part of a no-harm AI control system. The runtime telemetry collected at step 910 may include, without limitation, harm predictions generated by the harm predictor for candidate actions, confidence measures or uncertainty estimates accompanying the harm predictions, observed outcomes indicating whether harm actually occurred following action execution or abstention, enforcement decisions made by the safety enforcement module (e.g., allow, substitute, or abstain outcomes from method 800), contextual information such as state features and action characteristics, timestamps and session identifiers, and metadata such as model version identifiers and constraint profiles in use. In some embodiments, step 910 accesses telemetry from a monitoring pipeline (e.g., monitoring and audit module 150 or monitoring, audit, and outcome assessment system 400), retrieves records from an audit log store (e.g., audit log store 430), or receives telemetry streams in real time as enforcement decisions are made. Step 910 may further filter telemetry to select relevant samples, such as cases where harm predictions were made with high confidence, cases where outcomes are definitively known, or cases representing specific contexts or harm categories of interest for calibration. The collected telemetry provides the raw data needed to assess whether the harm predictor's predictions are well-calibrated and whether confidence estimates accurately reflect prediction reliability.

At step 920, local calibration statistics are computed based on the telemetry collected at step 910. In some embodiments, step 920 is performed by a local calibration statistics generator (e.g., local calibration statistics generator 524) that processes the telemetry to produce summary statistics describing calibration quality and prediction performance. The local calibration statistics may include, without limitation: calibration error metrics such as expected calibration error (ECE), maximum calibration error (MCE), or Brier score measuring the discrepancy between predicted probabilities and observed outcomes; prediction residuals representing the difference between predicted harm scores and observed harm magnitudes; confidence metrics such as the distribution of confidence values, the correlation between confidence and prediction accuracy, or the rate of over-confident or under-confident predictions; binned calibration curves representing the relationship between predicted probabilities and observed frequencies across discretized prediction bins; stratified statistics computed separately for different context categories, harm types, confidence levels, or deployment modes; and quantile summaries, confusion matrix elements, or receiver operating characteristic (ROC) metrics relevant to harm event detection. In some embodiments, step 920 computes calibration statistics over a sliding time window, over a fixed batch of recent samples, or cumulatively since the last calibration update, and may apply statistical weighting to emphasize recent data or high-confidence predictions. Step 920 may further compute multiple sets of statistics corresponding to different harm categories, different action types, or different operational contexts to enable context-specific calibration updates. The local calibration statistics produced at step 920 provide a compact summary of calibration quality suitable for transmission to a federated service without requiring sharing of raw telemetry data.

At step 930, privacy-preserving controls are applied to the local calibration statistics. In some embodiments, step 930 is performed by a privacy controls module (e.g., privacy controls module 542) that applies one or more privacy-preserving transformations to reduce the risk of disclosing sensitive information about individual deployment instances, individual users, or proprietary operational data. The privacy-preserving controls may include, without limitation: differential privacy noise injection in which calibrated noise is added to the statistics to provide formal differential privacy guarantees with a specified privacy budget (epsilon, delta); sensitivity clipping in which statistic values are clamped to a bounded range to limit the influence of outliers and reduce the sensitivity of aggregated results to individual data points; aggregation or binning in which fine-grained statistics are coarsened into broader bins or aggregates to reduce granularity and information leakage; encryption in which statistics are encrypted using homomorphic encryption, secure multi-party computation protocols, or transport-layer encryption to protect confidentiality during transmission; secure enclaves or trusted execution environments in which statistics are computed within hardware-protected enclaves to prevent unauthorized access; and hashing or anonymization in which identifiers are hashed or removed to decouple statistics from specific deployment instances or sessions. In some embodiments, step 930 applies a combination of privacy controls selected based on regulatory requirements, organizational policies, data sensitivity levels, or federation service configuration. Step 930 may further apply privacy controls adaptively based on the amount of data collected, such that instances with more data can apply less noise while still meeting privacy requirements. The privacy-preserving controls applied at step 930 enable federated calibration to be performed without requiring deployment instances to share raw sensitive data with the federation service or with other participants.

At step 940, the local statistics are packaged into privacy-protected update packets. In some embodiments, step 940 is performed by a privacy-preserving update packager (e.g., privacy-preserving update packager 526) that assembles the privacy-controlled statistics from step 930 into structured update packets suitable for transmission. The update packets may include, without limitation: the privacy-protected calibration statistics, metadata such as the deployment instance identifier (which may be pseudonymized or anonymized), the model version or harm predictor version in use, the time window or sample count over which statistics were computed, the context categories or stratification keys applicable to the statistics, a timestamp indicating when the packet was generated, cryptographic signatures or message authentication codes to ensure integrity and authenticity, version numbers or schema identifiers to ensure compatibility with the federation service, and privacy parameter metadata such as the differential privacy epsilon used or the clipping thresholds applied. In some embodiments, step 940 compresses the update packets to reduce transmission overhead, applies additional encryption for secure transport, and prepares the packets for batching or queuing. Step 940 may further include logic to determine whether sufficient local data has been collected to warrant sending an update, such that updates are sent only when statistics are statistically reliable or when a scheduled update window arrives.

At step 950, the update packets are transmitted from the distributed deployment instances to a federation coordinator. In some embodiments, step 950 uses a privacy-preserving update transport (e.g., privacy-preserving update transport 528) that provides secure, reliable, and authenticated communication between deployment instances and the federation service. The transmission may occur over secure network protocols such as TLS, HTTPS, or VPN connections, may use message queuing systems, publish/subscribe mechanisms, or direct API calls, and may support batching multiple updates, retry logic for failed transmissions, rate limiting to avoid overwhelming the federation service, and scheduling to avoid interference with runtime operations. In some embodiments, step 950 transmits updates asynchronously such that deployment instances continue normal operation without waiting for acknowledgment, or may use synchronous transmission with acknowledgment to ensure delivery. Step 950 may further implement client-side logic to manage update transmission frequency, to throttle updates during high-load periods, or to prioritize transmission of updates from instances experiencing calibration drift or degraded performance. The transmitted update packets are received by the federation coordinator in step 960.

At step 960, the federated coordinator receives and validates update packets from participating deployment instances. In some embodiments, step 960 is performed by a federated coordinator/aggregator (e.g., federated coordinator/aggregator 530) that orchestrates the collection and aggregation of updates across a federation of deployments. Step 960 receives update packets transmitted from multiple deployment instances, validates the integrity and authenticity of each packet by verifying cryptographic signatures or message authentication codes, checks compatibility by ensuring that packets conform to expected schemas and are compatible with the current federation round or model version, filters or rejects packets that fail validation checks, are corrupted, are duplicates, or are from unauthorized sources, and organizes packets by federation round, by context category, by harm predictor version, or by other grouping criteria to facilitate aggregation. In some embodiments, step 960 enforces participation thresholds requiring a minimum number of deployment instances to contribute updates before proceeding with aggregation, thereby ensuring that aggregated results are statistically meaningful and that individual contributions are sufficiently obscured. Step 960 may further manage federation round identifiers, track which instances have contributed to each round, and provide acknowledgments or receipts to participating instances. The validated update packets are then forwarded to step 970 for aggregation.

At step 970, secure and robust aggregation is performed to combine calibration statistics across the deployment instances. In some embodiments, step 970 is performed by a secure aggregation/robust aggregation module (e.g., secure aggregation/robust aggregation component 532) that aggregates the privacy-protected statistics from multiple update packets while providing additional privacy guarantees and robustness against corrupted or adversarial data. The aggregation process may include, without limitation: summing or averaging statistics across packets to compute fleet-wide calibration metrics, such as computing mean calibration error, aggregate prediction residuals, or pooled binned calibration curves; applying secure multi-party aggregation protocols in which individual contributions cannot be inferred even by the federation service, using techniques such as secure summation, threshold cryptography, or secret sharing; applying robust aggregation techniques to reduce sensitivity to outliers or adversarial inputs, such as computing trimmed means, medians, or quantile-based aggregates, applying outlier detection and filtering to remove packets with anomalous statistics, or using weighted aggregation that down-weights contributions from instances with low data quality or high variance; threshold-based aggregation in which only packets meeting quality or confidence thresholds are included; and stratified aggregation in which statistics are aggregated separately for different context categories, harm types, or deployment profiles to enable context-specific calibration. In some embodiments, step 970 produces aggregated calibration metrics that represent the collective calibration performance across the federation, and may further compute aggregate confidence intervals, aggregate bias estimates, or aggregate recalibration parameters. The aggregated statistics provide a basis for generating calibration updates that improve harm predictor performance across all participating deployments.

At step 975, a decision is made based on whether sufficient data quality has been achieved. In some embodiments, step 975 evaluates whether the aggregated statistics from step 970 are of sufficient quality, statistical reliability, and sample size to justify generating and distributing calibration updates. The evaluation criteria may include, without limitation: whether a minimum number of deployment instances contributed updates, whether the aggregated sample size exceeds a threshold, whether confidence intervals around aggregated statistics are sufficiently narrow, whether the aggregated statistics exhibit consistency or whether excessive variance suggests data quality issues, and whether a sufficient time window has elapsed since the last calibration update. If the data quality is insufficient (decision "No" at step 975), method 900 returns to step 910 to collect additional telemetry and wait for more data to accumulate. This may occur, for example, when only a few deployment instances have contributed updates, when the aggregated sample size is too small to reliably estimate calibration parameters, or when aggregated statistics exhibit high variance indicating inconsistency across deployments. If the data quality is sufficient (decision "Yes" at step 975), method 900 proceeds to step 980 to generate calibration updates.

At step 980, calibration updates are generated based on the aggregated statistics. In some embodiments, step 980 is performed by a calibration update generator (e.g., calibration update generator 534) that computes updated calibration parameters, mappings, or models designed to improve the alignment between harm predictor outputs and observed outcomes across the federation. The calibration updates may include, without limitation: updated calibration mappings such as Platt scaling parameters, isotonic regression mappings, or temperature scaling factors that transform raw harm predictor scores into better-calibrated probabilities; updated confidence estimation parameters such as revised uncertainty quantification models, updated epistemic uncertainty bounds, or recalibrated prediction intervals; updated threshold recommendations such as revised harm thresholds, revised confidence thresholds, or context-specific threshold adjustments derived from the observed calibration performance; updated risk score scaling parameters that adjust the dynamic range or sensitivity of harm scores; and context-specific calibration artifacts that provide different calibration parameters for different operational contexts, harm categories, or deployment modes. In some embodiments, step 980 applies calibration algorithms such as histogram binning, Bayesian calibration, neural calibration networks, or ensemble recalibration methods to learn calibration mappings from the aggregated statistics. Step 980 may further generate multiple calibration update variants for different deployment profiles, model versions, or use cases, and may include metadata specifying the applicability and compatibility of each update. The generated calibration updates are designed to reduce calibration error, improve confidence estimation accuracy, and enhance the reliability of harm predictions used for runtime enforcement decisions.

At step 985, the calibration updates are versioned, signed, and packaged with metadata and compatibility information. In some embodiments, step 985 assigns version identifiers to the calibration updates to enable tracking and rollback, applies cryptographic signatures to ensure integrity and authenticity of the updates, packages the updates into deployable artifacts that can be transmitted and applied at deployment instances, and includes metadata such as the applicable harm predictor model versions, the context categories or stratification keys for which the updates are valid, the date and time the updates were generated, the number of deployment instances that contributed to the aggregated statistics, provenance information indicating the source data and aggregation methods used, compatibility constraints specifying which runtime systems can apply the updates, and instructions or configuration specifying how the updates should be applied. In some embodiments, step 985 further generates release notes, validation summaries, or quality metrics describing the expected impact of the calibration updates on prediction performance. The versioned and signed calibration update packages produced at step 985 are ready for secure distribution to deployment instances.

At step 990, the calibration updates are distributed to participating deployment instances via secure channels. In some embodiments, step 990 is performed by an update distribution service (e.g., update distribution service 540) that pushes or makes available the calibration updates to the deployment instances that contributed telemetry or that are eligible to receive updates. The distribution may occur via push mechanisms in which the federation service actively transmits updates to deployment instances, pull mechanisms in which deployment instances periodically query for available updates, or hybrid approaches. Step 990 may use secure transport protocols, authenticated API endpoints, or encrypted file transfer to protect the updates during transmission, may apply access controls to ensure that only authorized deployment instances receive updates, may support staged rollouts in which updates are initially distributed to a subset of instances for validation before broader deployment, and may provide version checking and compatibility validation to ensure that updates are applied only to compatible runtime systems. In some embodiments, step 990 tracks which deployment instances have received updates, which instances have acknowledged receipt, and which instances have successfully applied updates, and may retry transmission for instances that failed to receive or apply updates. The distributed calibration updates are received by deployment instances in step 995.

At step 995, each deployment instance receives, validates, and applies the calibration updates to its local harm predictor. In some embodiments, step 995 is performed by a deployment-instance client (e.g., deployment-instance client 522) at each participating deployment that receives the calibration update package from the federation service, validates the cryptographic signature to verify integrity and authenticity, checks compatibility to ensure the update is applicable to the local harm predictor model version and operational context, applies the calibration updates by loading updated calibration mappings, confidence estimation parameters, or threshold recommendations into the harm predictor, and logs the update version and application timestamp to create an audit trail of calibration changes. In some embodiments, step 995 applies updates immediately upon receipt, applies updates during a scheduled maintenance window, or applies updates after performing local validation tests on held-out data or in a shadow mode to verify that the updates improve calibration performance. Step 995 may further compare pre-update and post-update calibration metrics on local data to confirm that the updates are beneficial, and may provide feedback to the federation service indicating successful application or reporting any issues encountered. Following successful application of the calibration updates, the local harm predictor at each deployment instance operates with improved calibration, thereby enhancing the reliability of harm estimates used in runtime enforcement decisions (e.g., in method 800).

At step 998, calibration performance is monitored and the next calibration round is scheduled. In some embodiments, step 998 monitors the performance of the updated harm predictor by tracking calibration metrics on newly collected data, comparing predicted harm to observed outcomes, and evaluating whether calibration quality remains satisfactory over time. Step 998 may compute running statistics on calibration error, monitor for signs of calibration drift such as increasing miscalibration or changes in the distribution of prediction residuals, and generate alerts or triggers if calibration performance degrades below acceptable thresholds. In some embodiments, step 998 schedules the next iteration of federated calibration by determining when to return to step 910 to begin collecting telemetry for a subsequent calibration round. The scheduling may be based on elapsed time (e.g., performing calibration updates weekly or monthly), accumulated sample count (e.g., triggering a new round after a threshold number of predictions have been made), detected drift (e.g., initiating recalibration when calibration error exceeds a threshold), or on-demand triggers (e.g., in response to deployment of a new model version or expansion into a new operational domain). Step 998 may further log calibration round completion, store calibration performance metrics in a safety metrics store (e.g., safety metrics store 432), and provide summary reports to operators or governance systems via an alerts and reports module (e.g., alerts and reports module 450) or an operator console (e.g., operator console/compliance interface 460). Following step 998, method 900 terminates for the current calibration round, having successfully updated harm predictor calibration across the federation, though in practice method 900 may be executed repeatedly in a continuous or periodic fashion to maintain calibration quality over the lifetime of the deployed AI systems.

In operation, method 900 enables harm prediction calibration across a distributed fleet of AI deployments by leveraging federated learning techniques that aggregate calibration signals without requiring sharing of raw sensitive data. By collecting local telemetry, computing privacy-protected statistics, securely aggregating across deployments, generating and distributing calibration updates, and monitoring ongoing performance, method 900 ensures that harm predictors remain well-calibrated as operating conditions evolve, data distributions shift, or new contexts are encountered. The privacy-preserving nature of the federation process protects deployment instance data while still enabling collective learning, and the robust aggregation techniques ensure resilience against data quality issues or adversarial contributions. While FIG. 9 illustrates one exemplary arrangement of steps, in other embodiments one or more steps may be reordered, parallelized, omitted, or combined, alternative privacy mechanisms or aggregation strategies may be employed, hierarchical or peer-to-peer federation architectures may be used, and additional validation or testing steps may be incorporated, provided that the method enables distributed collection of calibration signals, privacy-preserving aggregation, generation of calibration updates, and deployment-wide distribution of improved calibration parameters to maintain harm predictor accuracy and reliability across a federated AI control system.

Figure 10:
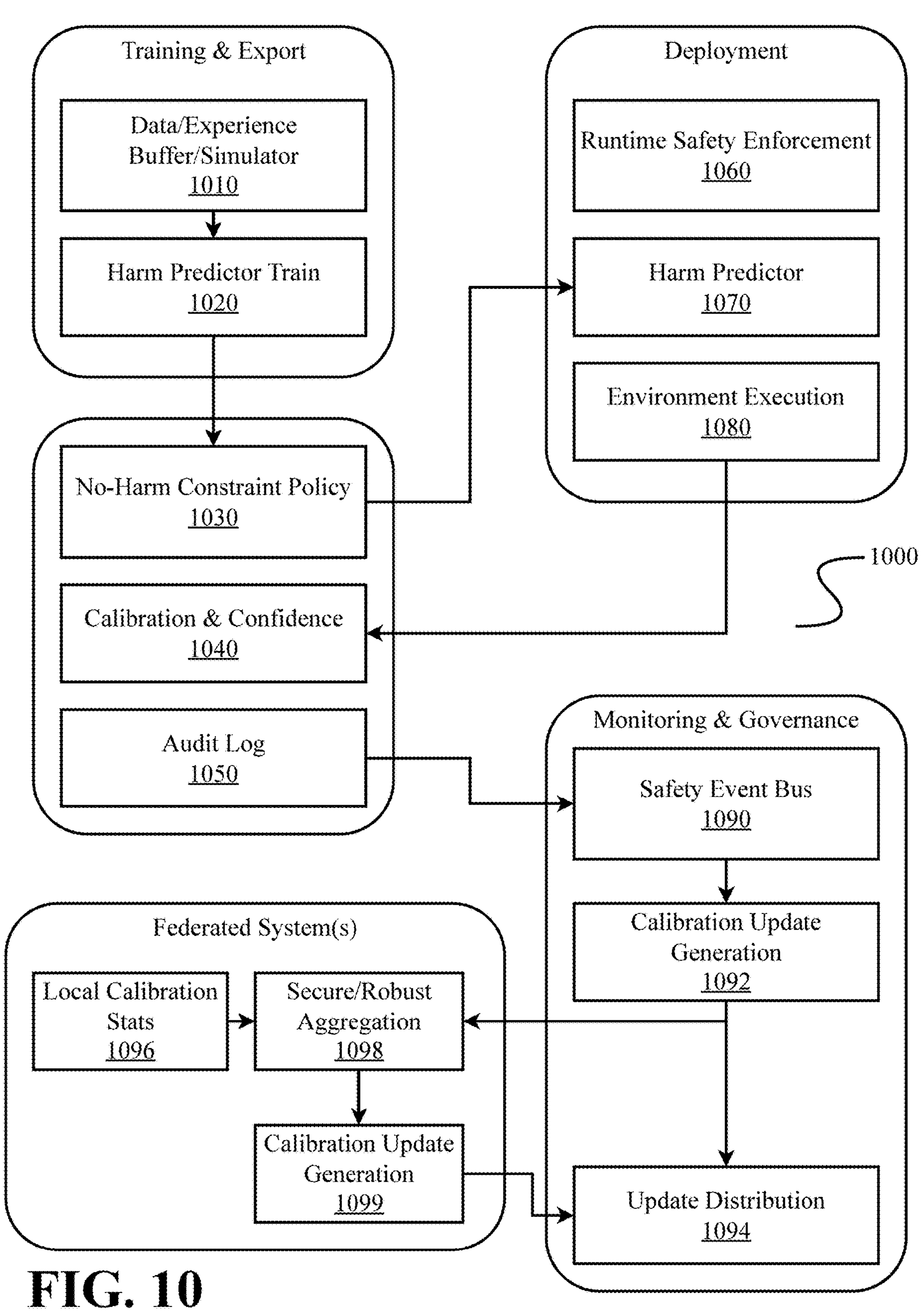
FIG. 10 is a block diagram illustrating an exemplary end-to-end lifecycle architecture for enforcing a no-harm directive in an artificial intelligence system, according to an embodiment.

FIG. 10 is a block diagram illustrating an exemplary end-to-end lifecycle architecture 1000 for enforcing a no-harm directive in an artificial intelligence system, according to an embodiment. Architecture 1000 provides a unified framework integrating training-time constraint enforcement, runtime safety mechanisms, continuous monitoring and governance, and federated calibration across distributed deployments, thereby enabling comprehensive no-harm operation across the complete lifecycle from model development through operational deployment and ongoing maintenance. Architecture 1000 may be implemented using one or more computing devices and may span training infrastructure, production deployment infrastructure, monitoring services, and federated coordination services, and the depicted functional blocks and data flows illustrate the relationships between training, deployment, and continuous improvement phases of the AI system lifecycle.

According to the embodiment, architecture 1000 comprises three primary operational phases: a training and export phase, a deployment phase, and a monitoring and governance phase, with an additional federated calibration mechanism that operates across multiple deployment instances. The training and export phase is responsible for producing trained policy models and harm predictors that satisfy no-harm constraints, the deployment phase executes the trained models in operational environments with runtime safety enforcement, and the monitoring and governance phase collects telemetry, detects anomalies, and triggers calibration updates to maintain safety performance over time.

In the training and export phase, a data/experience buffer/simulator 1010 provides training data, experience samples, and/or simulated environments used to train and evaluate the AI models. Data/experience buffer/simulator 1010 may comprise, without limitation, recorded state-action-outcome traces from prior deployments, curated training datasets, simulated rollouts generated by an environment model or digital twin, counterfactual examples, synthetic data, adversarial test cases, and human-labeled safety annotations. In some embodiments, data/experience buffer/simulator 1010 corresponds to training data/experience buffer 210 and environment model/simulator 212 of FIG. 2, and provides the raw experiential data needed to learn both a policy that proposes actions and a harm predictor that estimates harm associated with those actions. Data/experience buffer/simulator 1010 feeds training samples to downstream training components and may be continuously updated with new operational data as the system is deployed and used.

A harm predictor train (risk estimation) module 1020 is configured to train a harm predictor model that estimates harm associated with candidate actions in given states or contexts. In some embodiments, harm predictor train module 1020 implements supervised learning, semi-supervised learning, or reinforcement learning techniques to learn a function mapping state-action pairs to harm scores, harm probabilities, or harm distributions. Harm predictor train module 1020 may train a neural network, an ensemble model, a probabilistic model, a calibrated classifier, or another machine learning model using labeled or annotated harm data derived from data/experience buffer/simulator 1010. In some embodiments, harm predictor train module 1020 corresponds to harm predictor training module 240 of FIG. 2, and produces a harm predictor model capable of generating harm estimates with associated confidence measures for use in runtime enforcement. The trained harm predictor is used both during training to evaluate candidate policies and during deployment to assess proposed actions in real time.

A no-harm constraint policy module 1030 stores and provides constraint parameters used to enforce harm limits during training and deployment. In some embodiments, no-harm constraint policy module 1030 specifies multiple tiers of harm-related constraints including, without limitation, probability thresholds limiting the likelihood of harmful outcomes, Conditional Value-at-Risk thresholds limiting tail-risk severity, cumulative harm budgets limiting total harm over time horizons, and confidence thresholds requiring minimum prediction reliability. No-harm constraint policy module 1030 may correspond to harm constraint specification store 232 and no-harm constraint policy 134 of FIGS. 2 and 1 respectively, and may provide different constraint profiles for different operational contexts, domains, or deployment environments. The constraint parameters from no-harm constraint policy module 1030 are used to train policies under explicit harm constraints and to evaluate actions during runtime enforcement.

A calibration & confidence module 1040 is configured to calibrate the harm predictor and generate confidence estimates for harm predictions. In some embodiments, calibration & confidence module 1040 applies calibration techniques such as temperature scaling, Platt scaling, isotonic regression, or other calibration mappings to convert raw harm predictor outputs into well-calibrated probability estimates that accurately reflect the true likelihood of harm. Calibration & confidence module 1040 may further compute confidence measures such as prediction intervals, epistemic uncertainty estimates, or Expected Calibration Error (ECE) metrics that quantify the reliability of harm predictions. In some embodiments, calibration & confidence module 1040 corresponds to calibration and confidence estimation module 242 of FIG. 2, and produces calibration artifacts that are deployed alongside the harm predictor to ensure that harm estimates used in runtime decisions are trustworthy and properly calibrated. The calibration parameters generated by calibration & confidence module 1040 may be updated periodically based on observed prediction performance in deployment, as described further below in connection with the federated calibration section of architecture 1000.

An audit log (append) module 1050 is configured to maintain tamper-evident audit records documenting model versions, policy versions, calibration versions, training decisions, constraint parameters, and other provenance information. In some embodiments, audit log module 1050 implements an append-only log, a write-once datastore, a blockchain or distributed ledger, or another tamper-evident storage mechanism that preserves integrity and enables verification of training provenance and model lineage. Audit log module 1050 may store, without limitation, policy parameter snapshots, harm predictor parameter snapshots, calibration artifact versions, constraint profile identifiers, training dataset identifiers, evaluation metrics, validation results, and timestamps documenting when models were trained, validated, and exported. In some embodiments, audit log module 1050 corresponds to audit log store 430 of FIG. 4 and model registry and provenance store 620 of FIG. 6, and provides the traceability and compliance documentation needed for governance, incident response, and regulatory reporting. The audit records maintained by audit log module 1050 enable reconstruction of training conditions, comparison of model versions, and rollback to prior safe versions if safety degradation is detected.

In the deployment phase, a runtime safety enforcement (Shield allow/sub.sb/abstain) module 1060 is configured to intercept candidate actions proposed by a deployed policy and to enforce no-harm constraints through allow, substitute, or abstain decisions. In some embodiments, runtime safety enforcement module 1060 implements the Safety Shield described in connection with FIG. 1 (safety shield 142), FIG. 3 (safety shield 342), and method 800 of FIG. 8, and evaluates each candidate action against harm constraints by querying a harm predictor, comparing harm estimates to thresholds, and determining whether to permit execution, substitute a safer alternative, or abstain from action entirely. Runtime safety enforcement module 1060 receives candidate actions from a trained policy deployed in the operational environment, evaluates harm risk using harm predictor (calib) 1070, and outputs a final action, substituted action, or abstention decision for execution. The abbreviation "sub.sb" in runtime safety enforcement module 1060 refers to the substitution capability, indicating that the module can select and substitute safe alternative actions when the originally proposed action violates constraints.

A harm predictor (calibration) module 1070 provides calibrated harm estimation during runtime operation. In some embodiments, harm predictor module 1070 comprises a deployed instance of the harm predictor trained by harm predictor train module 1020 and calibrated using the calibration parameters produced by calibration & confidence module 1040. Harm predictor module 1070 receives a candidate action and current state or context from runtime safety enforcement module 1060, applies the harm predictor model to generate a harm score, applies calibration mappings to produce a calibrated harm probability or risk estimate, computes a confidence measure indicating prediction reliability, and returns the harm estimate and confidence to runtime safety enforcement module 1060 for constraint evaluation. In some embodiments, harm predictor module 1070 corresponds to harm predictor 130, and is periodically updated with improved calibration parameters generated by the federated calibration process described below. The calibrated harm predictions provided by harm predictor module 1070 support the reliability of runtime enforcement decisions, as poorly calibrated predictions could result in either excessive false alarms (over-cautious abstentions) or missed harms (under-cautious permissions).

An environment execution (action, substitute, abstention/safe-stop) module 1080 is responsible for executing the final action determined by runtime safety enforcement module 1060 in the operational environment. In some embodiments, environment execution module 1080 receives one of three types of outputs from runtime safety enforcement module 1060: an allowed action (the original candidate action when constraints are satisfied), a substituted action (a safe alternative action selected when the candidate violates constraints), or an abstention/safe-stop decision (when no safe action is available). Environment execution module 1080 may interface with robotic actuators, vehicle control systems, transaction execution services, content generation outputs, tool invocation interfaces, or other operational systems to carry out the commanded action or to execute a safe-stop behavior. In some embodiments, environment execution module 1080 corresponds to the execution pathway accessed via environment interface 112, and provides feedback regarding executed actions and observed outcomes to the monitoring and governance phase for safety assessment and calibration improvement.

In the monitoring and governance phase, a safety event bus (alerts, drift/anomaly) module 1090 is configured to collect safety-relevant telemetry from deployed instances, detect anomalous conditions, and generate alerts. In some embodiments, safety event bus module 1090 receives runtime telemetry including enforcement decisions, executed actions, harm estimates, confidence measures, constraint evaluation results, and observed outcomes from environment execution module 1080 and runtime safety enforcement module 1060. Safety event bus module 1090 may perform real-time analysis to detect drift signals such as shifts in input feature distributions, increases in harm prediction uncertainty, elevated rates of abstentions or substitutions, increases in disagreement between predicted and observed harm, or other indicators of degraded safety performance or changing operational conditions. In some embodiments, safety event bus module 1090 corresponds to safety event bus/stream processor 416 and drift and anomaly detector 442, and generates alerts for high-severity safety events, triggers escalation to human review when appropriate, and provides event streams to downstream monitoring and calibration components. The alerts and drift signals generated by safety event bus module 1090 enable proactive identification of safety issues before they result in harmful outcomes.

A calibration update gen (mappings, conf) module 1092 is configured to generate updated calibration parameters based on observed prediction performance. In some embodiments, update gen module 1092 receives telemetry and statistics describing the calibration quality of harm predictor module 1070, such as calibration error metrics, prediction residuals comparing predicted harm to observed outcomes, and confidence assessment statistics. Calibration update gen module 1092 computes improved calibration mappings designed to reduce calibration error, improve confidence estimation accuracy, or adapt to distribution shifts detected by safety event bus module 1090. In some embodiments, update gen module 1092 corresponds to calibration update generator 534, and may generate calibration updates locally based on telemetry from a single deployment instance, or may coordinate with the federated calibration section (described below) to generate updates based on aggregated statistics across multiple deployment instances. The updated calibration parameters produced by update gen module 1092 are packaged and distributed to deployed harm predictors to maintain prediction reliability over time.

An update distribution (signed, versioned) module 1094 is configured to package, sign, version, and distribute calibration updates and model updates to deployed instances. In some embodiments, update distribution module 1094 receives calibration updates from update gen module 1092 or from the federated calibration section, assigns version identifiers, applies cryptographic signatures to ensure integrity and authenticity, packages the updates into deployable artifacts, and distributes the updates to one or more deployment instances via secure channels. Update distribution module 1094 may implement staged rollouts, compatibility validation, rollback capabilities, and audit logging to ensure that updates are safely applied. In some embodiments, update distribution module 1094 corresponds to update distribution service 540 and rollout manager 640, and provides the controlled release mechanism that enables continuous improvement of harm predictor calibration without disrupting operational systems. The signed and versioned updates distributed by update distribution module 1094 are received by harm predictor module 1070 and applied to improve calibration accuracy based on observed operational performance.

In the federated calibration section, a local calibration statisics (e.g., stats) (ECE, bins, residual) module 1096 is configured to compute local calibration statistics at each deployment instance based on runtime telemetry. In some embodiments, local calibration stats module 1096 receives telemetry from the deployment phase including harm predictions, observed outcomes, and enforcement decisions, and computes summary statistics such as Expected Calibration Error, binned calibration curves showing predicted versus observed harm frequencies, prediction residuals representing the difference between predicted and actual harm, and confidence metrics assessing the reliability of confidence estimates. Local calibration stats module 1096 may compute statistics over sliding time windows, stratify statistics by context category or harm type, and apply privacy-preserving transformations to prepare statistics for transmission to a federated aggregation service. In some embodiments, local stats module 1096 corresponds to local calibration statistics generator 524, and produces compact summary statistics that enable federated learning without requiring sharing of raw operational data.

A secure/robust aggregation (DP, SMPC, trimmed mean) module 1098 is configured to aggregate local calibration statistics across multiple deployment instances in a privacy-preserving and robust manner. In some embodiments, secure/robust aggregation module 1098 receives local calibration statistics from multiple instances of local calibration stats module 1096 distributed across different deployment sites, devices, or operational environments, and performs secure aggregation using techniques such as differential privacy (DP) to provide formal privacy guarantees, secure multi-party computation (SMPC) to prevent individual contributions from being inferred, trimmed mean or median aggregation to reduce sensitivity to outliers or adversarial inputs, and threshold-based aggregation to ensure sufficient participation before generating updates. Secure/robust aggregation module 1098 computes aggregated calibration metrics representing the collective calibration performance across the federation of deployments. In some embodiments, secure/robust aggregation module 1098 corresponds to secure aggregation/robust aggregation component 532 and federated coordinator/aggregator 530 and steps 960, 970, and 975 of method 900, and enables federated learning that improves harm predictor calibration fleet-wide while preserving the privacy of individual deployment instances and maintaining robustness against data quality issues.

A calibration update gen (mappings, conf) module 1099 in the federated calibration section is configured to generate calibration updates based on the aggregated statistics produced by secure/robust aggregation module 1098. In some embodiments, calibration update gen module 1099 receives aggregated calibration metrics and computes updated calibration mappings, confidence estimation parameters, or threshold recommendations designed to improve calibration performance across all participating deployment instances. Calib update gen module 1099 may apply calibration algorithms such as isotonic regression, temperature scaling, Bayesian calibration, or neural calibration methods to learn improved calibration functions from the aggregated data. In some embodiments, calibration update gen module 1099 corresponds to calibration update generator 534, and produces calibration updates that are versioned, signed, and provided to update distribution module 1094 for distribution back to the deployed harm predictor modules 1070 across all participating deployment instances. The federated calibration process implemented by modules 1096, 1098, and 1099 enables continuous improvement of harm prediction accuracy without centralizing sensitive operational data, thereby satisfying both safety objectives and privacy requirements.

The data flows illustrated in architecture 1000 show the complete lifecycle of no-harm enforcement. Training data from data/experience buffer/simulator 1010 flows through harm predictor train module 1020 to produce a trained harm predictor, which is calibrated by calibration & confidence module 1040 and documented in audit log module 1050. The trained and calibrated harm predictor is deployed as harm predictor module 1070, where it supports runtime safety enforcement module 1060 in making allow/substitute/abstain decisions that are executed by environment execution module 1080. Runtime telemetry flows from the deployment phase to safety event bus module 1090, which triggers generation of calibration updates by calibration update gen module 1092 and distribution via update distribution module 1094 back to harm predictor module 1070. In parallel, local calibration statistics computed by local calibration stats module 1096 are aggregated by secure/robust aggregation module 1098 to generate federated calibration updates via calibration update gen module 1099, which are also distributed via update distribution module 1094 to improve calibration across the deployment fleet. The no-harm constraint policy module 1030 provides constraint parameters to both the training phase (to enforce constraints during policy training) and the deployment phase (to evaluate actions during runtime enforcement), ensuring consistency between training-time and runtime safety requirements.

In operation, architecture 1000 enables an implementer to maintain no-harm operation across the complete AI system lifecycle by integrating constrained training, runtime safety enforcement with autonomous abstention, continuous monitoring and drift detection, governance-grade audit logging, and privacy-preserving federated calibration. The unified architecture ensures that safety constraints enforced during training are maintained during deployment, that harm predictors remain well-calibrated as operating conditions change, that safety degradation is detected and corrected proactively, and that improvements learned from operational experience are shared across deployment instances without compromising privacy. While FIG. 10 illustrates one exemplary arrangement of components and data flows, in other embodiments one or more components may be combined, separated, replicated across services, implemented using alternative technologies, or extended with additional monitoring, governance, or safety mechanisms, provided that the architecture supports end-to-end no-harm enforcement spanning training, deployment, and continuous improvement phases with integrated monitoring, audit, and federated calibration capabilities.

Exemplary Computing Environment

Figure 11:
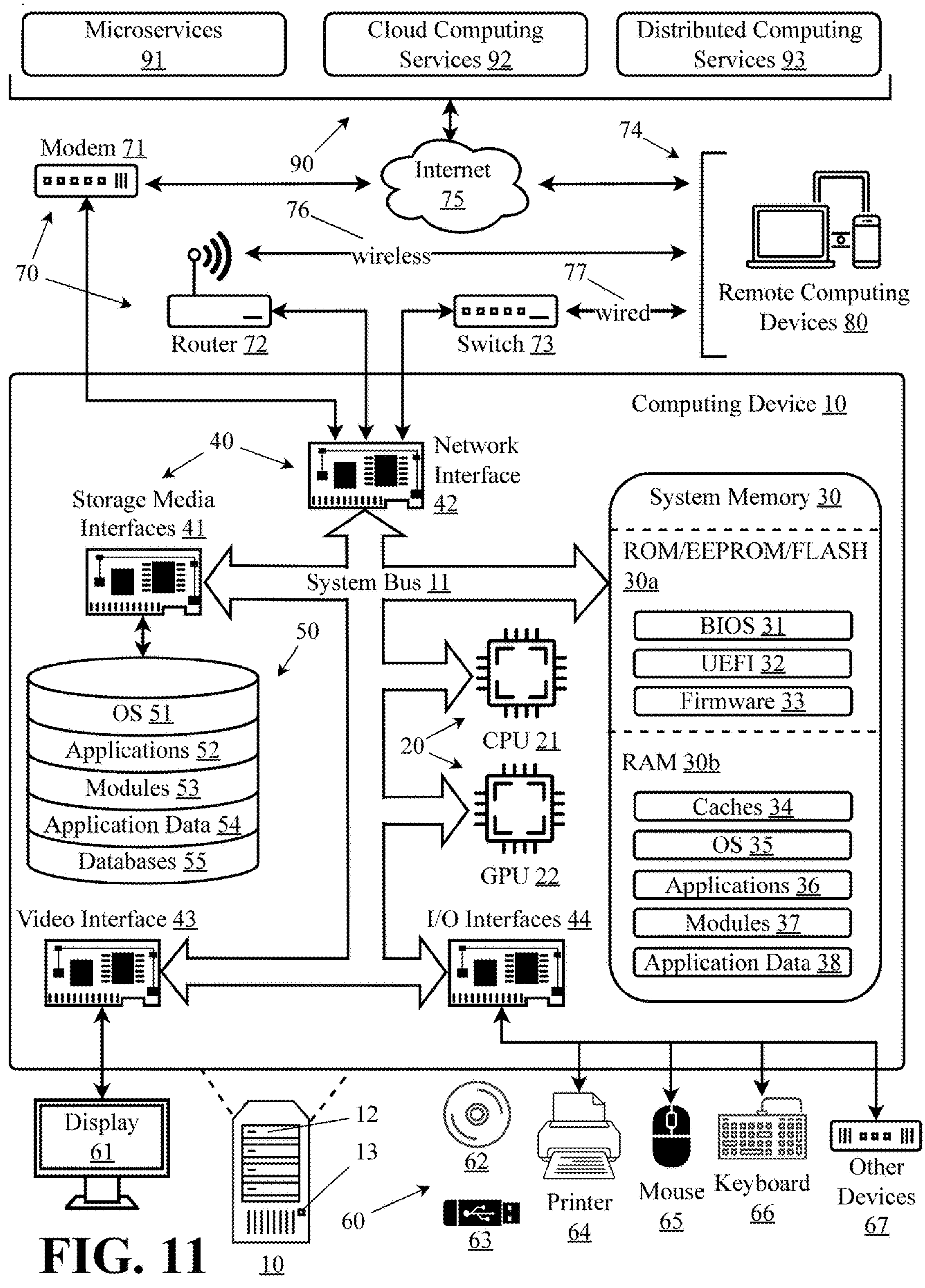
FIG. 11 illustrates an exemplary computing environment on which an embodiment described herein may be implemented.

FIG. 11 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30***a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for enforcing a no-harm directive in an artificial intelligence system, the system comprising:

one or more processors and one or more non-transitory computer-readable media storing instructions that, when executed, cause the system to:

train a policy model that generates candidate actions under a plurality of harm constraints by solving a constrained optimization that maximizes a primary utility subject to the plurality of harm constraints, the plurality of harm constraints comprising at least two different constraint types selected from a probability-of-harm limit, a tail-risk limit, and a cumulative harm budget, wherein the training comprises iteratively updating policy parameters and constraint enforcement variables until constraint satisfaction is achieved within a predefined tolerance;

evaluate a candidate action at runtime using a harm predictor that outputs a harm estimate quantifying predicted harm associated with the candidate action and a separate confidence measure quantifying reliability of the harm estimate, and enforce a no-harm constraint policy by permitting execution, substituting a safe alternative, or abstaining when constraints or confidence thresholds are not satisfied;

monitor and log the enforcement decision, harm estimate, context, and observed outcomes in an audit log, compute safety metrics, and generate recalibration or rollback triggers upon detection of drift, anomalies, or constraint violations; and update the harm predictor using federated calibration comprising local calibration statistics computed at each of a plurality of deployed instances, privacy-preserving aggregation of the local calibration statistics across the plurality of deployed instances, and distribution of updated calibration artifacts back to the plurality of deployed instances.

2. The system of claim 1, wherein the tail-risk limit comprises Conditional Value-at-Risk at a confidence predetermined level.

3. The system of claim 1, wherein the cumulative harm budget is enforced across an episode or rolling time window with reset conditions.

4. The system of claim 1, wherein the harm predictor is calibrated via temperature scaling, isotonic regression, or histogram binning and outputs epistemic and aleatoric uncertainty.

5. The system of claim 1, wherein the no-harm constraint policy includes a minimum confidence threshold that triggers conservative decisioning or abstention.

6. The system of claim 1, further comprising a human-value utility function that generates preference signals or normative constraints incorporated into training and/or enforcement.

7. The system of claim 1, wherein the substituting a safe alternative comprises at least one of: parameter clipping to a safe envelope, tool-path rerouting, content redaction, or fallback templates stored in a safe-action repository.

8. The system of claim 1, wherein monitoring computes near-miss rates, constraint activation rates, expected calibration error, and drift scores, and generates alerts via an operator console.

9. The system of claim 1, wherein federated calibration applies differential privacy noise injection, secure multiparty aggregation, trimmed-mean or median-based robust aggregation.

10. A computer-implemented method for enforcing a no-harm directive in an artificial intelligence system, comprising the steps of:

defining a harm functional and a constraint profile comprising at least a probability-of-harm limit and a tail-risk limit;

training a policy model that generates candidate actions under the harm constraints by solving a constrained optimization that maximizes a primary utility subject to the constraint profile, the training comprising iterative updates via primal-dual or Lagrangian updates to both policy parameters and constraint enforcement variables until constraint residuals meet a predefined tolerance;

at runtime, receiving state/context and a candidate action, obtaining calibrated harm score quantifying predicted harm associated with the candidate action and a separate confidence measure quantifying reliability of the calibrated harm score, and applying a multi-tier enforcement that allows, substitutes, or abstains;

logging enforcement records with model/version provenance and correlating records with observed outcomes; and performing federated calibration to update harm predictor calibration mappings and confidence parameters, the federated calibration comprising computing local calibration statistics at each of a plurality of deployed instances, privacy-preserving aggregation of the local calibration statistics across the plurality of deployed instances, and distributing updated calibration artifacts back to the plurality of deployed instances.

11. The method of claim 10, further comprising controlled rollout with canary deploys, release gatekeeping, compatibility checks among policy, harm predictor, and calibration artifacts, and rollback upon safety regression.

12. The method of claim 10, wherein the multi-tier enforcement, when abstaining, includes a safe-stop command for physical systems or a request-for-clarification for conversational systems.

13. A non-transitory computer-readable medium storing instructions that, when executed by one or more processors, perform the method of claim 10.

* * * * *